US009123250B2

(12) United States Patent
Duncan et al.

(10) Patent No.: US 9,123,250 B2
(45) Date of Patent: Sep. 1, 2015

(54) SYSTEMS AND METHODS FOR REPORTING REAL-TIME HANDLING CHARACTERISTICS

(71) Applicant: Elwha LLC, Bellevue, WA (US)

(72) Inventors: William David Duncan, Kirkland, WA (US); Roderick A. Hyde, Redmond, WA (US); Jordin T. Kare, Seattle, WA (US); Robert C. Petroski, Seattle, WA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 28 days.

(21) Appl. No.: 14/098,310

(22) Filed: Dec. 5, 2013

(65) Prior Publication Data

US 2015/0161893 A1 Jun. 11, 2015

(51) Int. Cl.

| | |
|---|---|
| ***G07C 5/00*** | (2006.01) |
| ***G08G 1/16*** | (2006.01) |
| ***B60W 30/14*** | (2006.01) |
| ***G07C 5/08*** | (2006.01) |

(52) U.S. Cl.
CPC .............. *G08G 1/163* (2013.01); *G07C 5/0816* (2013.01)

(58) Field of Classification Search
USPC .............................................................. 701/1
See application file for complete search history.

(56) References Cited

U.S. PATENT DOCUMENTS

| | | | | |
|---|---|---|---|---|
| 5,436,835 | A | 7/1995 | Emry | |
| 5,680,122 | A * | 10/1997 | Mio | 340/932 |
| 5,983,161 | A | 11/1999 | Lemelson et al. | |
| 6,032,097 | A * | 2/2000 | Iihoshi et al. | 701/96 |
| 6,275,773 | B1 | 8/2001 | Lemelson et al. | |
| 6,487,500 | B2 | 11/2002 | Lemelson et al. | |
| 7,889,065 | B2 | 2/2011 | Smith | |
| 8,090,489 | B2 | 1/2012 | Delean | |
| 2008/0243327 | A1 * | 10/2008 | Bujak et al. | 701/29 |
| 2009/0125174 | A1 | 5/2009 | Delean | |
| 2009/0174540 | A1 | 7/2009 | Smith | |
| 2011/0115644 | A1 * | 5/2011 | Grotendorst et al. | 340/903 |
| 2011/0184605 | A1 | 7/2011 | Neff | |
| 2012/0173530 | A1 * | 7/2012 | Kurciska et al. | 707/738 |
| 2012/0268295 | A1 * | 10/2012 | Yuse et al. | 340/905 |
| 2013/0030606 | A1 * | 1/2013 | Mudalige et al. | 701/2 |
| 2015/0046022 | A1 * | 2/2015 | Bai et al. | 701/31.5 |

* cited by examiner

*Primary Examiner* — Yonel Beaulieu

(57) ABSTRACT

A vehicle may include a monitoring unit configured to determine a time-varying handling characteristic of the vehicle. The time-varying handling characteristic may include a characteristic of vehicle performance in executing maneuvers, a status of a vehicle component (e.g., tires, brakes, drivetrain, etc.), and/or the like. The time-varying handling characteristic may be transmitted to one or more nearby vehicles to improve the ability of manual operators and/or automatic-driving software of the nearby vehicles to predict the performance of the vehicle in executing maneuvers, to be aware of a failure (or likely failure) of a vehicle component, and/or the like. Record of the transmission of the time-varying handling characteristic and/or of any acknowledgements of receipt of the time-varying handling characteristic by the nearby vehicles may be logged to a persistent storage device.

38 Claims, 13 Drawing Sheets

SYSTEMS AND METHODS FOR REPORTING REAL-TIME HANDLING CHARACTERISTICS

If an Application Data Sheet ("ADS") has been filed on the filing date of this application, it is incorporated by reference herein. Any applications claimed on the ADS for priority under 35 U.S.C. §§119, 120, 121, or 365(c), and any and all parent, grandparent, great-grandparent, etc., applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

PRIORITY APPLICATIONS

None

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

TECHNICAL FIELD

This application relates to systems and methods for transmitting real-time handling characteristics to nearby vehicles.

SUMMARY

A vehicle may include a monitoring unit configured to determine a time-varying handling characteristic of the vehicle. The monitoring unit may determine the status of one or more vehicle components, and the time-varying handling characteristic may be determined based on the status of the one or more vehicle components. Alternatively, or in addition, the time-varying handling characteristic may include the status of the one or more vehicle components. The time-varying handling characteristic may be specified in absolute units, relative units (e.g., relative to a standard value for the vehicle), and/or the like.

The vehicle may also include a communication unit. The communication unit may be configured to transmit the time-varying handling characteristic to one or more nearby vehicles. The time-varying handling characteristic may be transmitted according to a predetermined radio frequency or optical communication protocol. The one or more nearby vehicles may inform an operator and/or an automatic-driving software program of the time-varying handling characteristic. The one or more nearby vehicles may be within a predetermined range of the vehicle, may be unassociated with the vehicle (e.g., the one or more nearby vehicles may not be members of a convoy with the vehicle), and/or the like. The time-varying handling characteristic may be transmitted periodically, when a change in the value is detected, when a new nearby vehicle is detected, and/or the like. The vehicle may log the time-varying handling characteristic to a persistent storage device. Alternatively, or in addition, the vehicle may log transmission of the time-varying handling characteristic to the one or more nearby vehicles and/or may log any acknowledgements of receipt of the time-varying handling characteristic.

DETAILED DESCRIPTION OF PREFERRED EMBODIMENTS

Figure 1:
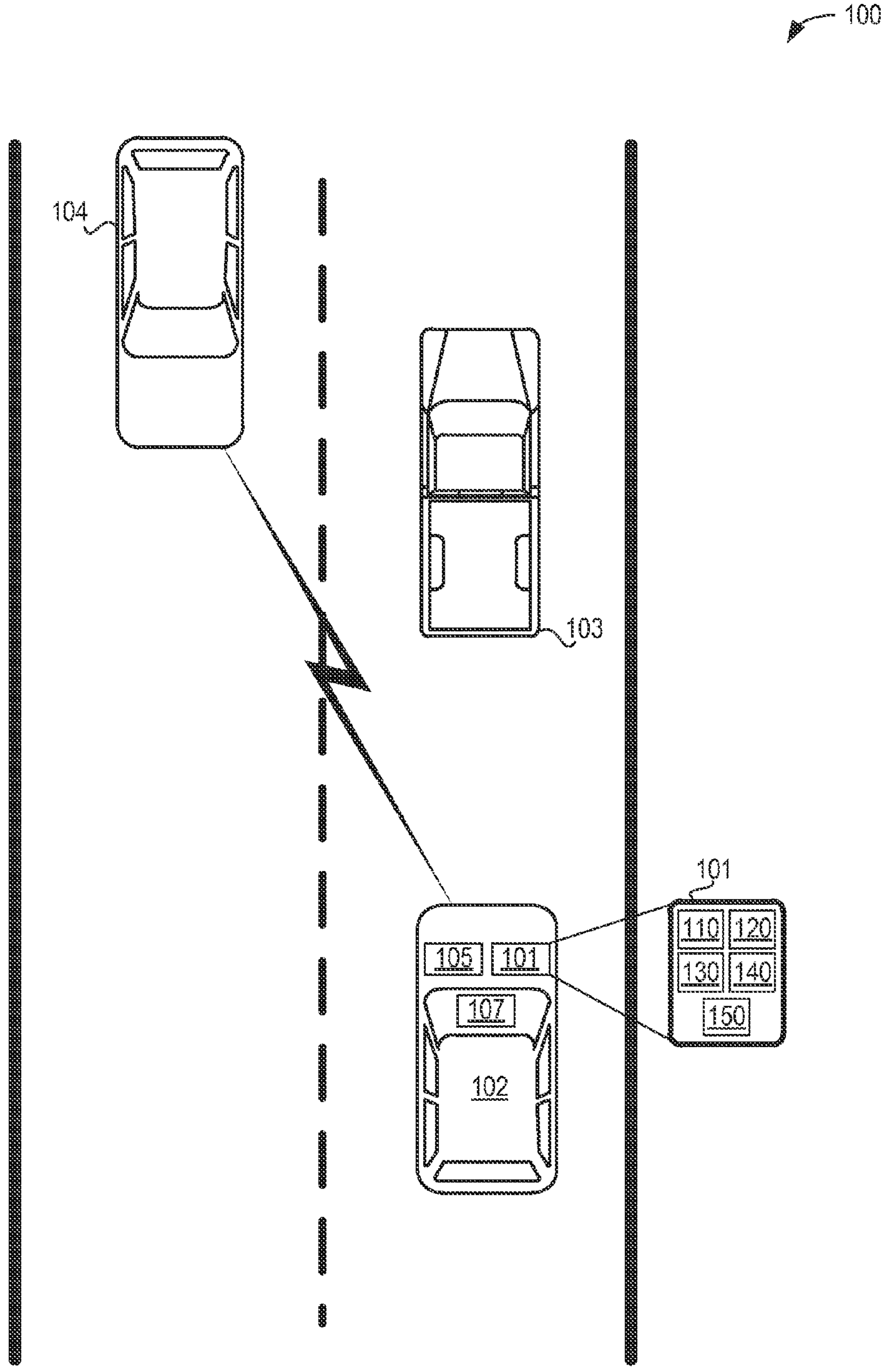
FIG. 1 is a block diagram depicting one embodiment of an exemplary computer system operating on a ground vehicle.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Much about the performance of a vehicle, such as its handling characteristics, the performance of an automatic-driving software program, performance of a non-automatic operator, etc., may be unknown to nearby vehicles. Accordingly, a maneuver by the vehicle may be unexpected by nearby vehicles, and/or the nearby vehicles may not know what performance to expect when a maneuver is being performed. By transmitting this type of information to nearby vehicles, the maneuvers and/or performance of the vehicle may be better predicted by automatically and/or manually operated nearby vehicles. The nearby vehicles may then be able to better avoid collisions with the vehicle and/or collisions caused by the nearby vehicles attempting to avoid the vehicle.

A vehicle may include a monitoring unit configured to determine a time-varying handling characteristic of the vehicle, a characteristic of an automatic-driving software program operating on the vehicle, a characteristic of performance of an operator of the vehicle, and/or the like. The vehicle may also include a communication unit configured to transmit the determined characteristic to a nearby vehicle. The nearby vehicle may present the characteristic to an operator of the nearby vehicle, for example, visually, audibly, haptically, and/or the like. Alternatively, or in addition, automatic-driving software on the nearby vehicle may use the received characteristic to make driving and/or collision avoidance decisions.

When determining a time-varying handling characteristic, the monitoring unit may determine a probabilistic description of the time-varying handling characteristic. The probabilistic description may include a mean value, a standard deviation, a probability distribution function, a median value, a mode, a maximum value, a minimum value, a moment, a quartile, a quantile, and/or the like. The time-varying handling characteristic may be computed for a current time and/or a future time (e.g., what the characteristic will be at a predetermined time in the future). The time-varying handling characteristics may include kinematic characteristics, such as a turning radius, a braking distance, an acceleration (e.g., a linear acceleration, a rotational acceleration, a deceleration, etc.), a jerk, and/or the like. The time-varying handling characteristic may include a stability margin for the vehicle. For example, the stability margin may be computed based on a wind loading of the vehicle, a weight distribution for the vehicle, and/or the like.

The time-varying handling characteristic may include and/or may be determined based on the status of a vehicle component. For example, the vehicle may transmit the status of the vehicle component to the nearby vehicle, and/or the vehicle may transmit a characteristic computed at least in part from the status of the vehicle component. The time-varying handling characteristic may include and/or may be determined based on a window status. The window status may include a windshield wiper status (e.g., whether the windshield wiper is operable, what amount of a blade of the windshield wiper is in contact with the windshield, and/or the like), a window cleaning fluid status (e.g., how much fluid is available, a temperature, etc.), a window cleanliness, and/or the like.

The time-varying handling characteristic may include and/or may be determined based on a tire status. The tire status may include tire traction, tire pressure, time since a tire change was last performed, distance driven since a tire change was last performed, estimated tire wear, an identifier for a tire (e.g., a make and a model of the tire), a type of tire, a condition for which the tire is optimized (e.g., dry conditions, wet conditions, snow and/or ice conditions, off-road conditions, etc.), whether the tire is a spare, and/or the like. The tire status may be a tire status for a single wheel and/or a plurality of wheels. The tire status may be determined for a particular maneuver, such as tire traction for a linear maneuver, a rotational maneuver, and/or the like. The monitoring unit may determine the tire status by measuring the tire status. The monitoring unit may measure the tire status by comparing an anticipated tire traction to an actual traction. The monitoring may determine the actual traction from performance of the vehicle in executing a maneuver.

The time-varying handling characteristic may include and/or may be determined based on a brake status. The braking status may include maximum deceleration, statuses of one or more types of brakes (e.g., a friction brake, a disc brake, a drum brake, a power brake, a hydraulic brake, an air brake, a regenerative brake, an engine brake, a compression release brake, an exhaust brake, etc.), the amount of energy that can be absorbed by a brake (e.g., a regenerative brake), the total braking ability of one or more types of brakes, a type of a brake pad, a braking ability when an anti-lock braking system is active, a braking ability when a brake is configured to lock a wheel, an effect of a road condition on braking ability, time since a brake was last replaced, distance since a brake was last replaced, an estimated brake wear, and/or the like. The brake status may be a brake status for a single type of brake, for a brake acting on a single wheel, for a plurality of brakes operating on a corresponding plurality of wheels, all vehicle brakes, and/or the like. The braking status may be determined for a particular maneuver, such as braking ability for a linear maneuver, a rotational maneuver, and/or the like.

The time-varying handling characteristic may include and/or may be determined based on a current weight. The current weight may include occupant weight, fuel weight, cargo weight, carried weight, a towed weight, and/or the like. The time-varying handling characteristic may include and/or may be determined based on a weight distribution. The weight distribution may be the load at one or more wheels, which may be detected by a weight sensor at each wheel, a load at an axle, and/or the like. The time-varying handling characteristic may include and/or may be determined based on a characteristic of a trailer, such as a weight, a length, a number of axles, a number of wheels, a type of wheels, and/or the like. The time-varying handling characteristic may include and/or may be determined based on a wind loading, an aerodynamic loading, and/or the like.

The time-varying handling characteristic may include and/or may be determined based on a drivetrain status. The drivetrain status may include four-wheel drive, two-wheel drive, all-wheel drive, and/or the like. Alternatively, or in addition, the drivetrain status may include combustion drive (e.g., power is being delivered by a combustion engine), electric drive (e.g., power is being delivered by an electric motor), a combination drive (e.g., power is being delivered by multiple types of power sources), and/or the like. The time-varying handling characteristic may include and/or may be determined based on available power from power source, a vehicle velocity, an engine or motor rotation speed, a gear ratio, a current power output from an electric motor, and/or the like. The time-varying handling characteristic may include and/or may be determined based on air intake status (e.g., filter cleanliness, altitude, etc.), fuel quality (e.g., octane rating), an oil pressure, an engine temperature, a battery status (e.g., an amount of energy available, an amount of energy that can be absorbed at the current charge level, etc.), an energy and/or power demand of an electrical component (e.g., energy and/or power demand by an air conditioner, a headlight, an audio-visual system, a user display interface, etc.), and/or the like. The time-varying handling characteristic may indicate a failure of a vehicle component (e.g., a complete failure, a partial failure, etc.), such as a loss of power steering, a flat tire, a loss of power braking, a complete loss of braking, a loss of mechanical power to the drivetrain, and/or the like.

The time-varying handling characteristic may be determined based on a condition external to the vehicle, such as a road type (e.g., asphalt, concrete, gravel, dirt, etc.), a road condition (e.g., dry, wet, oily, icy, snow covered, etc.), a weather condition (e.g., hot, cold, dry, rain, snow, sleet, hail, etc.), a visibility condition (e.g., clear, day, dusk, night, glare, fog, etc.), a road incline, a direction of the vehicle, and/or the like. In an embodiment, the time-varying handling characteristic may be determined based on the location of another vehicle. For example, the location of the other vehicle may affect aerodynamic loading of the vehicle and/or a field of view available to the vehicle, such as by obscuring the vision of a vehicle operator, by obscuring sensing by sensor (e.g., radar, lidar, a camera, etc.). Alternatively, or in addition, the time-varying handling characteristic may be determined based on handling characteristics reported by another vehicle and received via the communication unit, a planned maneuver reported by another vehicle and received via the communication unit, and/or the like. For example, the monitoring unit may constrain the time-varying handling characteristic to values that do not result in collision with another vehicle. The time-varying handling characteristic may be determined based on an occupant status, which may include an ability to perform a maneuver without injuring an occupant. The time-varying handling characteristic may be determined based on an intended path of the vehicle.

The time-varying handling characteristic may be expressed in various forms. For example, the time-varying handling characteristic may be expressed in absolute units, relative units, and/or the like. Relative units may be relative to a previously reported value, relative to a standard value (e.g., a standard value specific to a make and model of the vehicle), and/or the like. The communication unit may transmit a planned maneuver in addition to the time-varying handling characteristic. The communication unit may transmit anticipated and/or resulting changes in the time-varying handling characteristic as the planned maneuver is executed and/or may transmit anticipated and/or achieved performance in executing the maneuver. The communication unit may transmit the time-varying handling characteristic in response to a query, periodically, in response to detecting a change in the time-varying handling characteristic, in response to the change exceeding a predetermined threshold, without receiving a query and/or the like. The monitoring unit may determine the time-varying handling characteristic by performing a test, for example, periodically, in response to a query, and/or the like.

The time-varying handling characteristic may be transmitted to a specific nearby vehicle, to a plurality of nearby vehicles, in a predetermined direction, to vehicles within a predetermined distance, and/or the like. In some embodiments, the time-varying handling characteristic may be transmitted using electromagnetic radiation (e.g., radio-frequency radiation, optical radiation, and/or the like) or ultrasound. The communication unit may log transmission of the time-varying handling characteristic to a persistent computer readable storage medium. The communication unit may request an acknowledgement of receipt of the time-varying handling characteristic. If an acknowledgement of receipt is received by the communication unit, the acknowledgment of receipt may be saved to the persistent computer readable storage medium. The nearby vehicle may be unassociated with the vehicle (e.g., may not be part of a caravan with the vehicle), may be in a different lane than the vehicle, may be traveling in a different direction than the vehicle, may be within a predetermined range of the vehicle, may be manually operated, may be operated by an automatic system, may be travelling at a speed relative to the vehicle that is greater than a predetermined threshold, and/or the like. Similarly, the vehicle may be manually operated, operated by an automatic system, and/or the like.

In embodiments where the monitoring unit is determining a characteristic of an automatic-driving software program, the characteristic may include an identification of the automatic-driving software program. The identification may include a manufacturer, a model number, a serial number, a universal product code, a version number, a revision number, a firmware revision number, and/or the like. The identification may also or instead include a make, model, style, and/or year of the vehicle and/or the like. The characteristic may include a type of automatic-driving software program (e.g., a collision-avoidance software program, a completely autonomous driving software program, etc.), a feature of the automatic-driving software program, an indication that a feature has been disabled, a version of the automatic-driving software program (e.g., a version number), and/or the like.

The characteristic may include an adjustable parameter of the automatic-driving software program. For example, the adjustable parameter may include a setting of the automatic-driving software program. The adjustable parameter may include a parameter set by a user, a parameter set by a manufacturer, a parameter set by a software update, and/or the like. The adjustable parameter may include a maximum acceleration the software program is willing to use (e.g., a maximum linear acceleration, a maximum rotational acceleration, a maximum deceleration, etc.), a maximum jerk the software program is willing to use, a maximum braking the software program is willing to use, a maximum lateral avoidance distance the software program is willing to use, and/or the like. The adjustable parameter may include an occupant-based maneuver limit, such as a driver-based maneuver limit, a maneuver limit for each occupant, etc.

The adjustable parameter may include a parameter used in computing a collision avoidance decision, such as trigger criteria for performing a collision avoidance maneuver (e.g., object types to avoid, a time until collision below which the collision avoidance maneuver should be performed, a range to a target object, a probability of collision above which the collision avoidance maneuver should be performed, etc.), a risk tolerance parameter, a risk-damage tradeoff parameter, a parameter specifying how aggressively to avoid a collision, and/or the like. The adjustable parameter may include a response-time setting. The adjustable parameter may include a physics model parameter, such as a parameter used in predicting a path of the vehicle, a parameter used in predicting a path of a target object, a mass of the vehicle, a parameter used in estimating a mass of a target object, an aerodynamic drag of the vehicle, and/or the like. The adjustable parameter may include a collision modeling parameter, such as a detail level for collision modeling, a make-specific structural vehicle model, a generic structural vehicle model, a damage threshold, and/or the like.

The adjustable parameter may include which types of vehicle data are gathered by the automatic-driving software program and/or weights, sampling intervals, rejection thresholds, and/or the like for the gathered vehicle data. The adjustable parameter may include a filter value used to filter sensor data, a type of filter used to filter sensor data, a weight applied to sensor data, sampling interval for a sensor, a rejection threshold for sensor data, and/or the like. The adjustable parameter may include a response to a loss of sensor data, such as a response to a sensor failure, a response to a blind spot, and/or the like.

The adjustable parameter may include a driving style of the automatic-driving software program. For example, the adjustable parameter may include a braking style of the automatic-driving software program, such as a rate of deceleration versus time profile, a deceleration style for a complete vehicle stop, a deceleration style for a non-stopping deceleration, a deceleration style for stop-and-go traffic, and/or the like. The adjustable parameter may include a following distance. The adjustable parameter may include a turning style of the automatic-driving software program, such as a length of time a turn is signaled prior to turning, a length of time a turn is signaled prior to deceleration, a risk tolerance when executing turns, and/or the like. The adjustable parameter may include a lane changing style of the automatic-driving software program, such as a length of time a lane change is signaled prior to changing lanes, a time to change lanes once lane changing has begun, a lateral velocity during lane changing, a lateral acceleration during lane changing, a risk tolerance when changing lanes (e.g., a risk tolerance when crossing a broken yellow line), and/or the like.

The adjustable parameter may include a curve navigation style of the automatic-driving software program, such as a curve navigation speed relative to a recommended speed (e.g., a recommended speed determined from location-based metadata, an advisory speed limit specified by a government body, etc.), a curve navigation speed relative to acceleration measurements, and/or the like. The adjustable parameter may include a merging style, such as a following distance prior to merging, aggressiveness during merging, and/or the like. The adjustable parameter may include a speed parameter, such as a vehicle speed relative to a speed limit (e.g., a speed limit specified by a government body, a manufacturer recommended speed limit, etc.), a plurality of speed settings for a corresponding plurality of speed limits, and/or the like.

The adjustable parameter may include a lawfulness of the automatic-driving software program. For example, the adjustable parameter may include a willingness to perform a prohibited turn (e.g., a right turn, a left turn, a U-turn, etc.), a minimum speed at traffic control devices indicating a complete stop is required before procession (e.g., whether the vehicle comes to a complete stop at red lights and/or stop signs), a minimum speed when turning right at traffic control devices indicating procession is prohibited (e.g., whether the vehicle comes to a complete stop when turning right at a red light and/or stop sign), a willingness to cross double-yellow lines, and/or the like. The adjustable parameter may include an overall aggressiveness of the automatic-driving software program, aggressiveness at a changing traffic signal (e.g., aggressiveness at a yellow light), aggressiveness when turning at a traffic control device indicating turning vehicles should proceed with caution (e.g., aggressiveness at flashing yellow arrows), an overall defensiveness of the automatic-driving software program, a willingness to yield to encroaching vehicles, and/or the like. The adjustable parameter may include whether the automatic-driving software program controls an emergency vehicle and/or whether emergency lights and/or emergency sirens on the emergency vehicle are active.

The characteristic of the automatic-driving software program may include a characteristic of an automatic-driving software algorithm, such as a known defect, a formula for determining expected vehicle movements from control system inputs, and/or the like. The characteristic may include a control system input (e.g., a throttle input, a brake input, a steering input, etc.), and/or the control system input may be transmitted to the nearby vehicle by the communication unit in addition to the characteristic. The characteristic may include an algorithm for deciding whether to perform a collision avoidance maneuver, an algorithm for selecting a type of collision avoidance maneuver, an algorithm for updating a collision avoidance maneuver based on movement of an object to be avoided, and/or the like.

The characteristic of the automatic-driving software program may include whether the automatic-driving software program is configured to use a real-time location sensor (e.g., a sensor configured to receive a signal from a satellite navigation system), whether the automatic-driving software program is configured to use digital map data, the digital map data used by the automatic-driving software program, and/or the like. The characteristic may include the type of a sensor used by the automatic-driving software program, a setting of a sensor, and/or the like. The characteristic may include performance of a sensor (e.g., in absolute units, relative units, etc.), such as a performance relative to an ideal performance specified by a sensor manufacturer, a range of the sensor, a directionality of the sensor, a field of view of the sensor, a blind spot of the sensor, and/or the like. The sensor may include a camera, radar, lidar, and/or the like. The characteristic of the automatic-driving software program may include a value of an internal variable of the automatic-driving software program, such as a variable for computing a collision avoidance decision, a confidence score for a collision avoidance action, and/or the like. The characteristic of the automatic-driving software program may include an indication of a dynamic decision, such as a collision avoidance decision, by the automatic-driving software program.

The characteristic of the automatic-driving software program may include whether the automatic-driving software program is currently controlling the vehicle, which systems the automatic-driving software program is currently controlling, whether the automatic-driving software program is in a hot standby mode from which it can quickly begin controlling the vehicle, which systems the automatic-driving software program can begin controlling quickly, whether the automatic-driving software program is disconnected, and/or the like. The characteristic may include whether an operator is manually overriding the automatic-driving software program (e.g., overriding a single maneuver of the automatic-driving software program, completing taking over the vehicle with manual control, etc.), whether the automatic-driving software program is overriding manual control, whether remote control of the vehicle is overriding manual control by an occupant, and/or the like. The characteristic may include whether a collision avoidance maneuver has been triggered and/or may include an object to be avoided, a kinematic characteristic of the object to be avoided (e.g., an object position, object velocity, object acceleration, etc.), a type of the object, and/or the like. The communication unit may also or instead transmit a planned maneuver, anticipated performance in executing the planned maneuver, achieved performance in executing the planned maneuver and/or the like.

The communication unit may transmit the characteristic of the automatic-driving software program in response to a query, periodically, in response to detecting a change in the characteristic, in response to the change exceeding a predetermined threshold, without receiving a query and/or the like. The monitoring unit may determine the characteristic by performing a test (e.g., periodically, in response to a query, etc.). The characteristic may be transmitted to a specific nearby vehicle, to a plurality of nearby vehicles, in a predetermined direction, to vehicles within a predetermined distance, and/or the like. In some embodiments, the characteristic may be transmitted using electromagnetic radiation (e.g., radio-frequency radiation, optical radiation, and/or the like) or ultrasound. The communication unit may log transmission of the characteristic to a persistent computer readable storage medium. The communication unit may request an acknowledgement of receipt of the characteristic. If an acknowledgement of receipt is received by the communication unit, the acknowledgment of receipt may be saved to the persistent computer readable storage medium. The nearby vehicle may be unassociated with the vehicle (e.g., may not be part of a caravan with the vehicle), may be in a different lane than the vehicle, may be traveling in a different direction than the vehicle, may be within a predetermined range of the vehicle, may be manually operated, may be operated by an automatic system, may be travelling at a speed relative to the vehicle that is greater than a predetermined threshold, and/or the like. Similarly, the vehicle may be manually operated, operated by an automatic system, and/or the like.

In embodiments where the monitoring unit is determining a characteristic of performance of an operator of a vehicle, the characteristic may include a historical characteristic, a real-time characteristic, and/or the like. The characteristic may include a response time of the operator. The characteristic may also or instead include a braking capability of the operator, such as an ability of the operator to judge distance from another vehicle, an ability of the operator to judge velocity of another vehicle, an ability of the operator to judge acceleration of another vehicle (e.g., ability to judge linear acceleration, rotational acceleration, deceleration, etc.), and/or the like. The characteristic may include a number of decelerations by the operator with a rate of deceleration greater than a predetermined threshold, a percentage of decelerations with a rate of deceleration greater than a predetermined threshold, a statistical characterization of decelerations (e.g., a mean, a standard deviation, a probability distribution function, a median value, a mode, a maximum value, a minimum value, a moment, a quartile, a quantile, etc.), a statistical characterization of deceleration from a predetermined time period (e.g., a life of the vehicle, the past year, etc.), a rate of deceleration versus time profile, and/or the like. The characteristic may include a deceleration characteristic for a complete vehicle stop, for a non-stopping deceleration, for stop-and-go traffic, and/or the like.

The characteristic of performance of the vehicle operator may include a turning capability of the operator. The characteristic may include whether the operator signals prior to turning, a length of time the operator signals prior to turning, whether the operator signals prior to braking for a turn, a length of time between signaling and braking and which occurred first (e.g., a negative time value may indicate an opposite order from a positive time value), whether the operator looks in proper directions prior to turning, whether the operator properly checks mirrors prior to turning, whether the operator properly checks blind spots prior to turning, a risk tolerance of the operator when executing turns, and/or the like. The characteristic may include a curve navigation characteristic, such as a curve navigation speed relative to a recommended speed (e.g., a recommended speed determined from location-based metadata, an advisory speed limit specified by a government body, etc.), a curve navigation speed relative to acceleration measurements, and/or the like. The characteristic may include a merging capability, such as a following distance prior to merging, an operator aggressiveness during merging, and/or the like.

The characteristic of performance of the vehicle operator may include a lane changing capability of the operator, such as whether the operator signals lane changes, a length of time the operator signals prior to changing lanes, whether the operator looks in proper directions prior to changing lanes, whether the operator properly checks mirrors prior to changing lanes, whether the operator properly checks blind spots prior to changing lanes, and/or the like. The characteristic may include a time to change lanes once lane changing has begun, a lateral velocity during lane changing, a lateral acceleration during lane changing, a risk tolerance of the operator when changing lanes (e.g., a risk tolerance when crossing a broken yellow line, etc.), and/or the like. The characteristic may include a time to extinguish a turn signal (e.g., does the operator forget to extinguish the turn signal), whether the time to extinguish exceeds a predetermined time threshold, a statistical characteristic of the time to extinguish the turn signal (e.g., a number of instances where the time exceeded a predetermined time threshold, a percentage of instances where the time exceeded a predetermined time threshold, etc.), a statistical characteristic of aborted lane changes after signaling (e.g., a number of aborted lane changes, a percentage of aborted lane changes, etc.), whether the operator fails to extinguish a turn signal after aborting lane changes, and/or the like.

The characteristic of vehicle operator performance may include a speed characteristic, such as a vehicle speed relative to a speed limit (e.g., a speed limit determined from location-based metadata, a speed limit specified by a government body, a manufacturer recommended speed limit, etc.), a plurality of speed characteristics for a corresponding plurality of speed limits, and/or the like. The characteristic may include a following distance. The characteristic may include a lawfulness of the operator. The characteristic may include whether the operator proceeds at traffic control devices indicating procession is prohibited (e.g., a traffic control device prohibiting left turns, prohibiting proceeding straight, prohibiting right turns, prohibiting U-turns, etc.), whether the operator comes to a complete stop when turning right at a traffic control device indicating procession is prohibited, an aggressiveness of the operator when turning at a traffic control device indicating turning vehicles should proceed with caution, whether the operator performs a turn at a traffic control device indicating that the turn is prohibited (e.g., a right turn, a left turn, a U-turn, etc.), whether the operator comes to a complete stop at traffic control devices indicating a complete stop is required before procession, whether the operator crosses double-yellow lines, whether the operator proceeds in a prohibited direction on roadways, and/or the like. The characteristic may include an aggressiveness of the operator (e.g., whether the operator crosses intersections during a solid yellow traffic signal, whether traffic signals turn red while the operator is crossing an intersection, a frequency of lane changes maneuvers, etc.), a defensiveness of the operator, and/or the like.

The monitoring unit may detect an impairment of the operator, such as whether the operator is impaired, a level of impairment, a frequency of impairment, and/or the like. For example, the impairment may include fatigue of the operator. Fatigue may be detected by sensing eye movement, sensing eyelid closure (e.g., the frequency of eyelid closure, the duration of one or more eyelid closures, etc.), sensing head movement of the operator, sensing a vital statistic of the operator (e.g., heart rate, respiration rate, blood pressure, pupil diameter, etc.), sensing vehicle motion, and/or the like. The impairment may include distraction of the operator, such as distraction from a passenger, from an audio/visual device, from a mobile communication device, from outside the vehicle, and/or the like. The distraction may be detected by sensing eye position of the operator, sensing head position of the operator, sensing torso position of the operator, sensing arm position of the operator, sensing vehicle motion, sensing vehicle cabin audio (e.g., sensing a noise level of the vehicle cabin audio, sensing whether the operator is conversing, for example, using speaker recognition, etc.), sensing use of vehicle controls (e.g., climate controls, audio/visual controls, etc.), sensing an object in the operator's hand (e.g., a mobile communication device, a food item, a beverage, a personal hygiene item, etc.), and/or the like.

The impairment may include a chemical impairment, such as a drug impairment (e.g., a prescription drug impairment, an illegal drug impairment, etc.), an alcohol impairment, and/or the like. The drug impairment may be detected by sensing a vital statistic of the operator (e.g., heart rate, respiration rate, blood pressure, pupil diameter, etc.), sensing vehicle motion, and/or the like. The alcohol impairment may be detected by sensing a vital statistic of the operator (e.g., heart rate, respiration rate, blood pressure, pupil diameter, etc.), sensing alcohol concentration in an exhalation of the operator, sensing nystagmus in the operator, sensing vehicle motion, and/or the like. The impairment may include a medical impairment, failure to compensate for a medical condition (e.g., a vision impairment, a hearing impairment, etc.), an emotional impairment, and/or the like. The monitoring unit may be configured to alert the operator of the impairment. The characteristic may include a number, a frequency, and/or a type of traffic citation (e.g., driving while impaired by a chemical substance such as alcohol).

The characteristic of performance of the vehicle operator may include performance of the operator in an adverse weather condition, such as a speed in the adverse weather condition (e.g., an absolute speed, a speed relative to a safe speed, etc.), a speed when navigating curves in the adverse weather condition (e.g., an absolute speed, a speed relative to a safe speed, etc.), a following distance in the adverse weather condition, and/or the like. The adverse weather condition may include rain, heavy rain, snow, freezing rain, fog, and/or the like. The characteristic may include performance of the operator at night, such as a speed at night, a speed relative to a headlight illumination distance, and/or the like. The characteristic may include a road familiarity rating for the operator (e.g., a number of traversals of a current location, a time since a most recent traversal of a current location, and/or the like).

The characteristic may include an experience level of the operator (e.g., an age of the operator, driving hours by the operator, time of possession of a license, etc.). The characteristic may be determined based on performance of a plurality of operators, may be an operator-specific characteristic, and/or the like. For example, the operator may be identified by receiving an indication from the operator, from a sensor, based on a driving style of the operator, and/or the like. The characteristic may include an overall operator ability, an individual trait of the operator, and/or the like. The characteristic may include an absolute score and/or rating, a relative score and/or rating (e.g., a score relative to an average operator, a score relative to a median operator, etc.). The characteristic may include performance relative to humans, performance relative to automatic-driving software, and/or the like. The characteristic may include whether a score indicative of operator performance exceeds a threshold. The vehicle may include a human-machine interface configured to indicate the characteristic to the operator, to provide an instruction to the operator on how to improve the characteristic, and/or the like.

The communication unit may transmit the characteristic of performance of the vehicle operator in response to a query, periodically, in response to detecting a change in the characteristic, in response to the change exceeding a predetermined threshold, without receiving a query and/or the like. The monitoring unit may determine the characteristic by performing a test (e.g., periodically, in response to a query, etc.). The characteristic may be transmitted to a specific nearby vehicle, to a plurality of nearby vehicles, in a predetermined direction, to vehicles within a predetermined distance, and/or the like. In some embodiments, the characteristic may be transmitted using electromagnetic radiation (e.g., radio-frequency radiation, optical radiation, and/or the like). The communication unit may log transmission of the characteristic to a persistent computer readable storage medium. The communication unit may request an acknowledgement of receipt of the characteristic. If an acknowledgement of receipt is received by the communication unit, the acknowledgment of receipt may be saved to the persistent computer readable storage medium. The nearby vehicle may be unassociated with the vehicle (e.g., may not be part of a caravan with the vehicle), may be in a different lane than the vehicle, may be traveling in a different direction than the vehicle, may be within a predetermined range of the vehicle, may be manually operated, may be operated by an automatic system, may be travelling at a speed relative to the vehicle that is greater than a predetermined threshold, and/or the like.

Embodiments may include various steps, which may be embodied in machine-executable instructions to be executed by a computer system. A computer system comprises one or more general-purpose or special-purpose computers (or other electronic devices). The computer system may comprise hardware components that include specific logic for performing the steps or may comprise a combination of hardware, software, and/or firmware.

Embodiments may also be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD ROMs, DVD ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or "Internet" or IP networks, such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may comprise a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

The network may include communications or networking software, such as the software available from Novell, Microsoft, Artisoft, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Each computer system includes at least a processor and a memory; computer systems may also include various input devices and/or output devices. The processor may include a general purpose device, such as an Intel®, AMD®, or other "off-the-shelf" microprocessor. The processor may include a special purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer executable code located within a memory device. A software module may, for instance, comprise one or more physical or logical blocks of computer instructions, which may be organized as a routine, program, object, component, data structure, etc., that perform one or more tasks or implement particular abstract data types.

In certain embodiments, a particular software module may comprise disparate instructions stored in different locations of a memory device, different memory devices, or different computers, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as: general purpose computers; computer programming tools and techniques; computer networks and networking technologies; digital storage media; authentication; access control; and other security tools and techniques provided by public keys, encryption, firewalls, and/or other means.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

FIG. 1 is a block diagram 100 depicting one embodiment of an exemplary computer system 101 operating on a ground vehicle 102, such as a car, truck, bus, train, or any other type of vehicle. The computer system 101 may include a monitoring unit 110 configured to determine the value of a time-varying handling characteristic of the vehicle 102. The monitoring unit 110 may include one or more sensors (not shown), electronic devices, and/or software programs (e.g., software programs configured to operate on a processor 130) that it uses to determine the time-varying handling characteristic. In some embodiments, the computer system 101 may also include a test unit 120 configured to perform a test that will allow the monitoring unit 110 to determine the time-varying handling characteristic. The monitoring unit 110 and/or the test unit 120 may be communicatively coupled to a vehicle control system 105 and may operate and/or interact with the vehicle control system 105. The vehicle control system 105 may include a system for providing control inputs to the vehicle (e.g., steering, braking (deceleration), acceleration, and so on), an electronic computer unit, vehicle software, and/or the like.

The monitoring unit 110 and/or the test unit 120 may be communicatively coupled to human-machine interface components 107 of the vehicle. The human-machine interface components 107 may allow the monitoring unit 110 and/or another vehicle system to receive information from and/or deliver information to an operator and/or occupant. The human-machine interface components 107 may include, but are not limited to: visual display components (e.g., display screens, heads-up displays, or the like), audio components (e.g., a vehicle audio system, speakers, or the like), haptic components (e.g., power steering controls, force feedback systems, or the like), and so on. The human-machine interface components 107 may include an entertainment system, a hands-free communication system, a mapping and/or traffic reporting system, a driver impairment detection system, and/or the like. The human-machine interface components 107 may allow the software program to deliver an alert to a vehicle operator.

The monitoring unit 110 may determine the time-varying handling characteristic by directly measuring the time-varying handling characteristic, by computing the time-varying handling characteristic from the status of vehicle components and/or sensor measurements, by determining limits on the time-varying handling characteristics due to the location of another vehicle (e.g., the vehicle 103), and/or the like. In some embodiments, the monitoring unit 110 may require the test unit 120 to perform a test that will allow the monitoring unit 110 to determine the time-varying handling characteristic. For example, the vehicle 102 may need to perform a particular maneuver for the time-varying handling characteristic to be determined (e.g., braking hard to determine tire traction and/or ability to decelerate). Accordingly, the test unit 120 may interact with the vehicle control system 105 to cause the vehicle 102 to execute a desired maneuver that will allow the time-varying handling characteristic to be determined by the monitoring unit 110.

The computer system 101 may include a communications interface 140 for communicating with a nearby vehicle (e.g., the nearby vehicle 104). The communications interface 140 may transmit the time-varying handling characteristic to the nearby vehicle 104 to thereby improve decision making by a manual and/or automatic operator of the nearby vehicle 104. The communications interface 140 may include, but is not limited to, one or more: wireless network interfaces, cellular data interfaces, satellite communication interfaces, electro-optical network interfaces (e.g., infrared communication interfaces), wired network interfaces, and/or the like and/or may facilitate physical transport of storage media. The communications interface 140 may be configured to communicate directly with other vehicles, in vehicle-to-vehicle "ad-hoc" networks and/or infrastructure networks, such as the Internet, and/or the like. The communications interface 140 may cryptographically protect messages, such as by encrypting messages, digitally signing messages, and/or the like, and/or may be able to decode and/or authenticate received messages.

The computer system 101 may further include a storage device 150 that is configured to store the value of the time varying handling characteristic and/or log communications by the communications interface 140, such as queries for the time-varying handling characteristic, transmission of the time-varying handling characteristic, acknowledgements of receipt of the time-varying handling characteristic, etc. The storage device 150 may include persistent storage media, such as hard disks, solid-state storage, optical storage media, or the like. The persistent storage media may also store program code for the monitoring unit 110, the test unit 120, and/or the like, and/or a separate storage media may store the program code for the monitoring unit 110 and/or the test unit 120. The storage device 150 may be configured to prevent unauthorized access to and/or modification of stored information. Accordingly, the storage device 150 may be configured to encrypt information for storage. The storage device 150 may also provide for validating authenticity of stored information; for example, the storage device 150 may be configured to cryptographically sign stored information.

Figure 2:
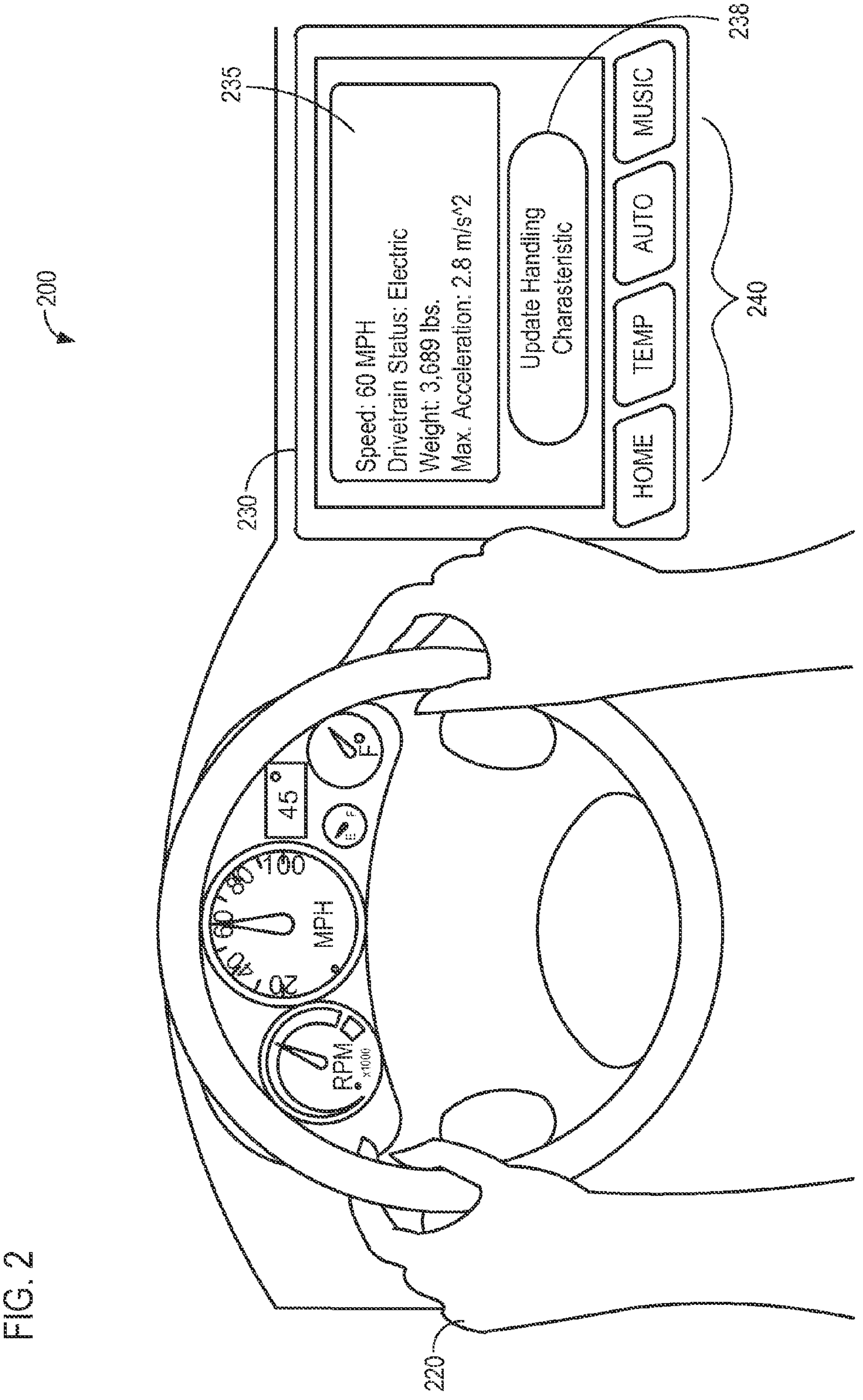
FIG. 2 is a perspective view of a vehicle cockpit according to one embodiment of a system for determining a time-varying handling characteristic.

FIG. 2 is a perspective view of a vehicle cockpit 200 according to one embodiment of a system for determining a time-varying handling characteristic. In the illustrated embodiment, information 235 about a time-varying handling characteristic may be displayed to an operator 220. The information 235 may be provided via screen 230 that is configured to serve multiple purposes 240. Some embodiments may not provide the information 235 about the time-varying handling characteristic to the operator 220 and, for example, may transmit the information 235 about the time-varying handling characteristics to a nearby vehicle without providing it to the operator 220.

In the illustrated embodiment, the vehicle has determined the speed of the vehicle, the status of the drivetrain (e.g., that an electric power source is providing power to the drivetrain), and the current weight of the vehicle. Based on these determined values, the vehicle has computed that the maximum acceleration that it will be able to achieve is 2.8 m/s^2. The operator 220 may be able to request that the vehicle recompute the time-varying handling characteristic, for example, by touching an "Update Handling Characteristic" button 238. In response, the vehicle may update the measurements of speed, drivetrain status, and weight, and recompute time-varying handling characteristic based on the updated measurements. Alternatively, or in addition, the vehicle may periodically update the measurements and/or periodically update the time-varying handling characteristic.

Figure 3:
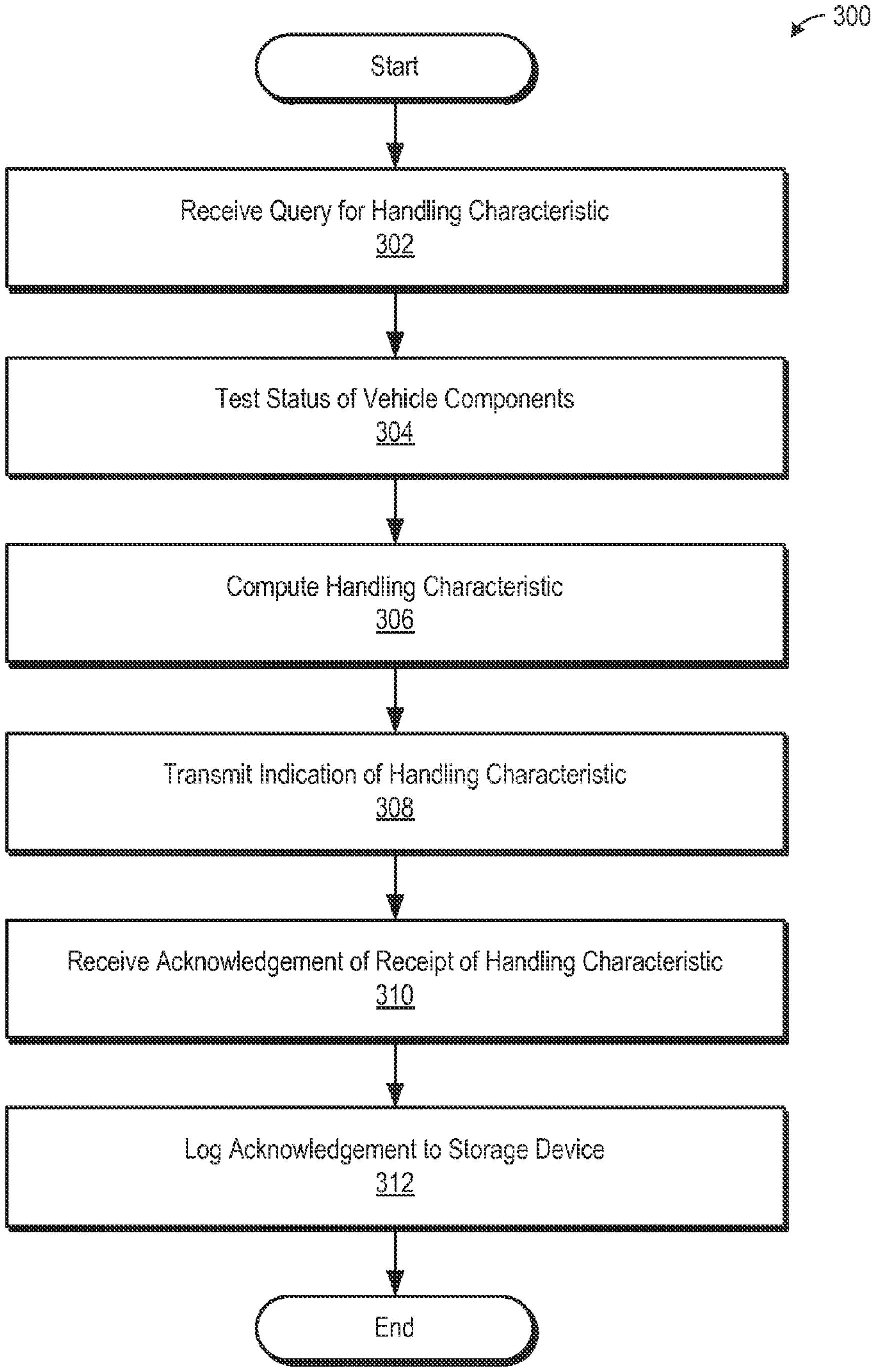
FIG. 3 is a flow diagram of one embodiment of a method for reporting a time-varying handling characteristic to a nearby vehicle.

FIG. 3 is a flow diagram of one embodiment of a method 300 for reporting a time-varying handling characteristic to a nearby vehicle. The method 300 may begin when a query for the time-varying handling characteristic is received 302 from the nearby vehicle. In other embodiments, the method 300 may begin periodically and/or without receiving 302 a query. The query may specify which time-varying handling characteristic should be provided, may request all time-varying handling characteristics, may request time-varying handling characteristics that have changed since the last query, and/or the like.

For some time-varying handling characteristics, the status of one or more vehicle components and/or measurements from one or more sensors may be needed to determine the time-varying handling characteristic. Accordingly, step 304 may include testing the status of one or more vehicle components and/or acquiring measurements from one or more sensors. The particular vehicle components tested and/or sensor measurements may be determined based on the time-varying handling characteristics requested by the query and unnecessary testing and/or measuring may not be performed. Alternatively, or in addition, the status of the one or more vehicle components and/or the measurements from the one or more sensors may be acquired periodically, and a memory and/or storage device may be accessed to retrieve the most recent values.

The time-varying handling characteristic may be computed 306, for example, based on the status of the one or more vehicle components and/or the measurements from the one or more sensors. In alternate embodiments, the time-varying handling characteristic may be determined by directly measuring the characteristic, by performing a test maneuver that allows the time-varying handling characteristic to be determined, and/or the like. If additional time-varying handling characteristics need to be determined, steps 304 and/or 306 may be repeated for each additional time-varying handling characteristic to be determined.

At step 308, each time-varying handling characteristic that was determined in steps 304 and 306 may be transmitted to the nearby vehicle. The time-varying handling characteristic may be transmitted to one or more other nearby vehicles in addition to the nearby vehicle that transmitted the query. For example, the time-varying handling characteristic may be transmitted to all vehicles within a predetermined range regardless of which vehicle(s) transmitted a query. A record of the transmission may be logged to a storage device and may include a time stamp. The record may include an indication of the time-varying handling characteristic (e.g., an identifier for the time-varying handling characteristic) and/or the value of the time-varying handling characteristic that was transmitted. The transmission may include a request for acknowledgement of receipt by the nearby vehicle of the time-varying handling characteristic. Alternatively, or in addition, a request for acknowledgement may be transmitted separately, and/or the requirement to acknowledge receipt may be specified in the communication protocol without a request being required.

The vehicle may receive 310 an acknowledgement of receipt of the time-varying handling characteristic from the nearby vehicle(s). The acknowledgement may indicate the particular time-varying handling characteristic and/or value for the time-varying handling characteristic that was received by the nearby vehicle. The acknowledgement may be digitally signed by the nearby vehicle. The vehicle may log 312 the acknowledgement by saving it to a persistent storage device. The acknowledgement may be logged with the corresponding record of the transmission. Alternatively, or in addition, the acknowledgement may include a time stamp, an indication of the time-varying handling characteristic, the value of the time-varying handling characteristic, and/or the like that allows it to be saved independent of the transmission. Once the acknowledgement has been logged 312 to the storage device, the method 300 may end until a new query is received 302 and/or a predetermined time has elapsed. In some embodiments, an acknowledgement may not be received and the method 300 may end after the time-varying handling characteristic is transmitted 308 (e.g., an acknowledgement may not be expected, a predetermined time may have elapsed without the acknowledgement being received, etc.).

Figure 4:
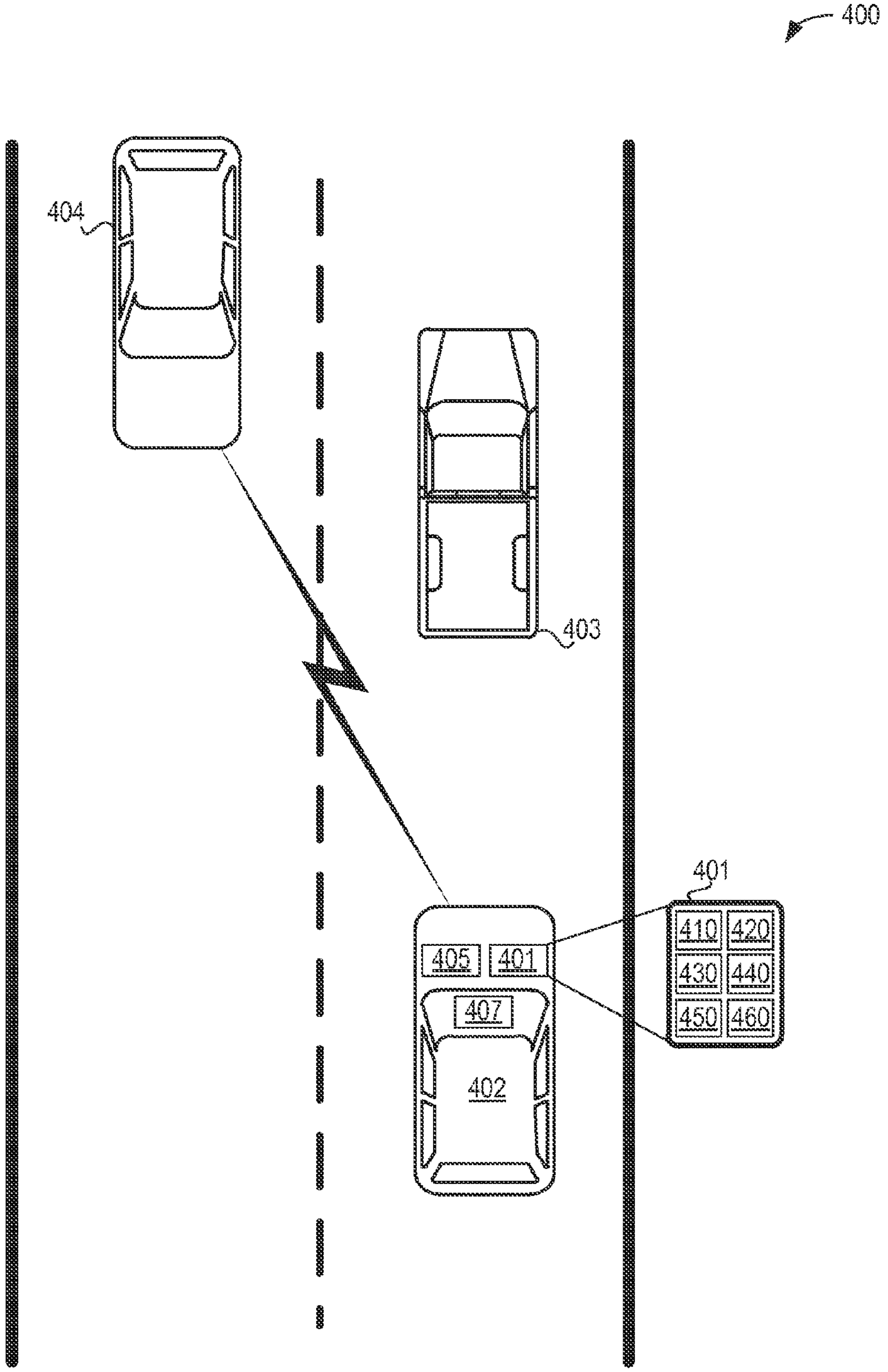
FIG. 4 is a block diagram depicting one embodiment of an exemplary computer system operating on a ground vehicle.

FIG. 4 is a block diagram 400 depicting one embodiment of an exemplary computer system 401 operating on a ground vehicle 402, such as a car, truck, bus, train, or any other type of vehicle. The computer system 401 may include a monitoring unit 410 configured to determine the value of a characteristic of performance of an automatic-driving software program 460 operating on the vehicle 402. The monitoring unit 410 may include one or more sensors (not shown), electronic devices, and/or software programs (e.g., software programs configured to operate on a processor 430) that it uses to determine the characteristic of performance of the automatic-driving software program 460. In some embodiments, the computer system 401 may also include a test unit 420 configured to perform a test that will allow the monitoring unit 410 to determine the characteristic of performance of the automatic-driving software program 460. The monitoring unit 410, the test unit 420, and/or the automatic-driving software program 460 may be communicatively coupled to a vehicle control system 405 and may operate and/or interact with the vehicle control system 405. The vehicle control system 405 may include a system for providing control inputs to the vehicle (e.g., steering, braking (deceleration), acceleration, and so on), an electronic computer unit, vehicle software, and/or the like.

The monitoring unit 410, the test unit 420, and/or the automatic-driving software program 460 may be communicatively coupled to human-machine interface components 407 of the vehicle. The human-machine interface components 407 may allow the monitoring unit 410, the automatic-driving software program 460, and/or the like to receive information from and/or deliver information to an operator and/or occupant. The human-machine interface components 407 may include, but are not limited to: visual display components (e.g., display screens, heads-up displays, or the like), audio components (e.g., a vehicle audio system, speakers, or the like), haptic components (e.g., power steering controls, force feedback systems, or the like), and so on. The human-machine interface components 407 may include an entertainment system, a hands-free communication system, a mapping and/or traffic reporting system, a driver impairment detection system, and/or the like. The human-machine interface components 407 may allow the software program to deliver an alert to a vehicle operator.

The monitoring unit 410 may determine the characteristic of performance of the automatic-driving software program 460 based on an identification of the automatic-driving software program 460, by directly communicating with the automatic-driving software program 460, by monitoring the inputs to the control system 405, and/or the like. In some embodiments, the monitoring unit 410 may require the test unit 420 to perform a test that will allow the monitoring unit 410 to determine the characteristic. For example, the performance of a sensor may need to be tested if the characteristic includes the performance of the sensor and/or is affected by the performance of the sensor. Alternatively, or in addition, the test unit 420 may request identification information, the value of an internal variable, the results from one or more dynamic decisions, and/or the like from the automatic-driving software program 460. The test unit 420 may cause a vehicle component (e.g., the automatic-driving software program, a sensor, etc.) to perform a self-test, may retrieve data from the vehicle component from which the test unit 420 can determine performance, may cause the vehicle component to perform one or more actions that will allow the monitoring unit 410 and/or test unit 420 to determine performance, and/or the like.

The computer system 401 may include a communications interface 440 for communicating with a nearby vehicle (e.g., the nearby vehicles 403, 404). The communications interface 440 may transmit characteristic of performance of the automatic-driving software program 460 to the nearby vehicle 404 to thereby improve decision making by a manual and/or automatic operator of the nearby vehicle 404. The communications interface 440 may include, but is not limited to, one or more: wireless network interfaces, cellular data interfaces, satellite communication interfaces, electro-optical network interfaces (e.g., infrared communication interfaces), wired network interfaces, and/or the like and/or may facilitate physical transport of storage media. The communications interface 440 may be configured to communicate directly with other vehicles, in vehicle-to-vehicle "ad-hoc" networks and/or infrastructure networks, such as the Internet, and/or the like. The communications interface 440 may cryptographically protect messages, such as by encrypting messages, digitally signing messages, and/or the like, and/or may be able to decode and/or authenticate received messages.

The computer system 401 may further include a storage device 450 that is configured to store the value of the characteristic of performance of the automatic-driving software program and/or log communications by the communications interface 440, such as queries for the characteristic of performance, transmission of the characteristic of performance, acknowledgements of receipt of the characteristic of performance, etc. The storage device 450 may include persistent storage media, such as hard disks, solid-state storage, optical storage media, or the like. The persistent storage media may also store program code for the monitoring unit 410, the test unit 420, the automatic-driving software program 460, and/or the like, and/or a separate storage media may store the program code for the monitoring unit 410, the test unit 420, and/or the automatic-driving software program. The storage device 450 may be configured to prevent unauthorized access to and/or modification of stored information. Accordingly, the storage device 450 may be configured to encrypt information for storage. The storage device 450 may also provide for validating authenticity of stored information; for example, the storage device 450 may be configured to cryptographically sign stored information.

Figure 5:
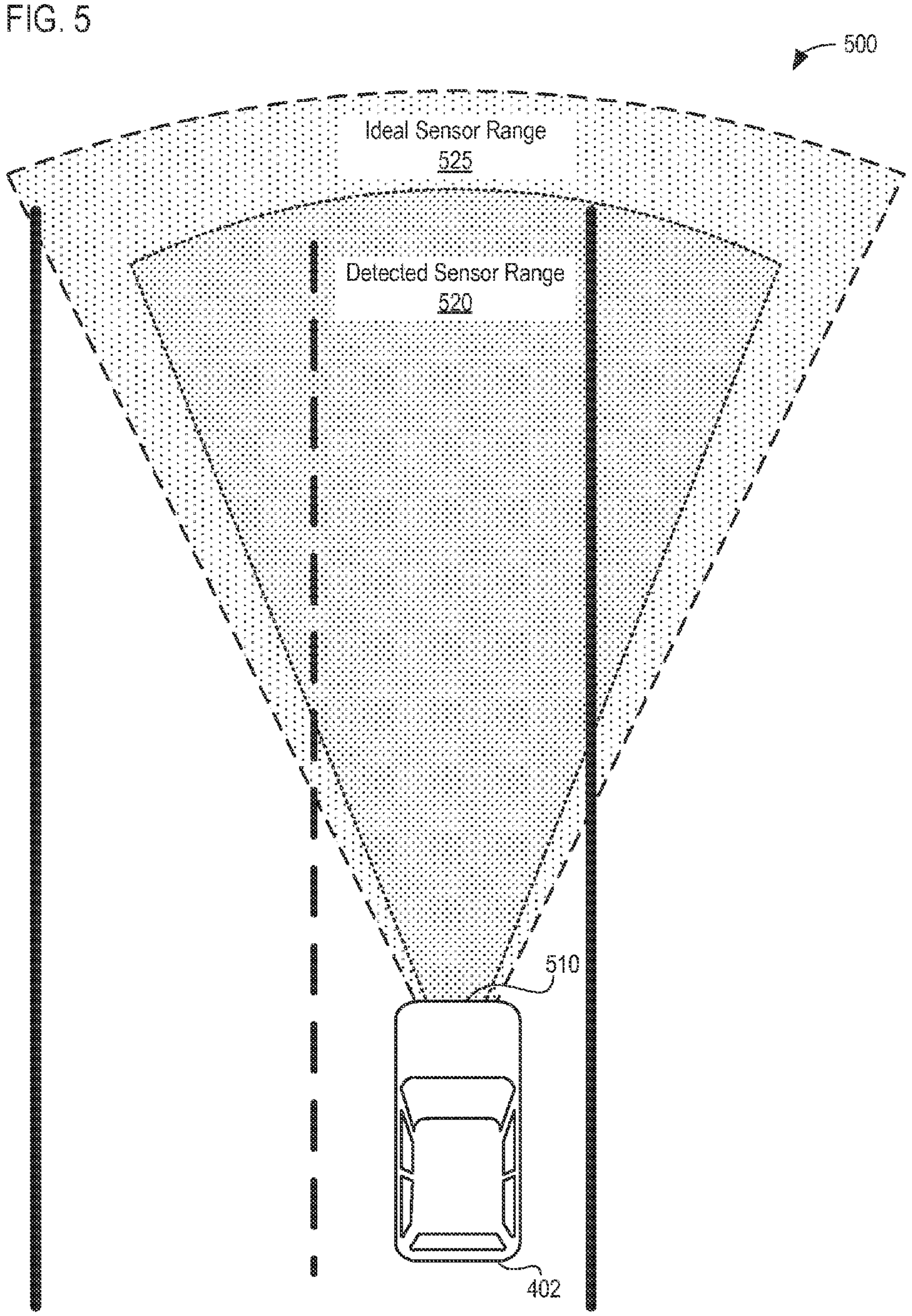
FIG. 5 is a schematic diagram of the vehicle testing the range of a sensor.

FIG. 5 is a schematic diagram 500 of the vehicle 402 testing the range of a sensor 510. The sensor 510 may have an ideal range 525. The ideal range 525 may be a manufacturer specified range, a previously measured range, and/or the like. The vehicle 402 may have stored the range (e.g., on the storage device 450) for later comparison. The sensor 510 may also have a currently detected range 520 (e.g., a range determined by the monitoring unit 410 and/or test unit 420). Because the detected range 520 is less than the ideal range 525, the vehicle 402 may report the degraded sensor performance to nearby vehicles and/or may report the performance of the automatic-driving software program resulting from the degraded sensor performance (e.g., a slower reaction time, poorer avoidance capabilities, etc.).

Figure 6:
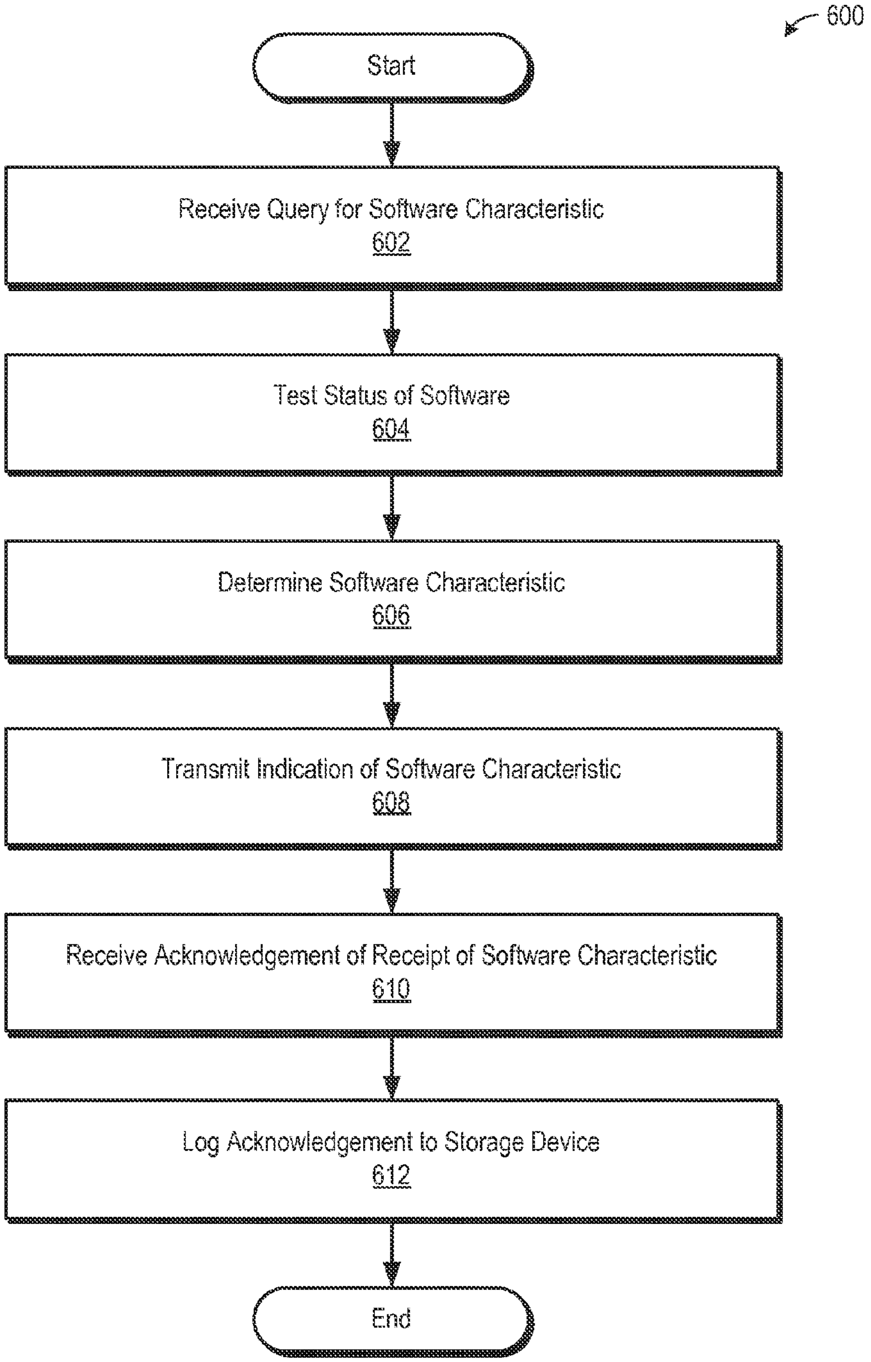
FIG. 6 is a flow diagram of one embodiment of a method for reporting a characteristic of performance of an automatic-driving software program to a nearby vehicle.

FIG. 6 is a flow diagram of one embodiment of a method 600 for reporting a characteristic of performance of an automatic-driving software program to a nearby vehicle. The method 600 may begin when a query for the characteristic of performance is received 602 from the nearby vehicle. In other embodiments, the method 600 may begin periodically and/or without receiving 602 a query. The query may specify which characteristic of performance should be provided, may request all characteristics of performance of the automatic-driving software program, may request characteristics of performance that have changed since the last query, and/or the like.

For some characteristics of performance of the automatic-driving software program, a test of the automatic-driving software program and/or one or more sensors may need to be performed to determine the characteristic. Accordingly, step 604 may include testing the status of the automatic-driving software program and/or one or more sensors. The particular test that is performed may be determined based on the characteristic of performance requested by the query and unnecessary testing and/or measuring may not be performed. Alternatively, or in addition, the status of the automatic-driving software program and/or one or more sensors may be acquired periodically, and a memory and/or storage device may be accessed to retrieve the most recent values. The characteristic of performance may be computed 606, for example, based on the results of the test performed in step 604 and/or based on data received directly from the automatic-driving software program. If additional characteristics of performance need to be determined, steps 604 and/or 606 may be repeated for each additional characteristic of performance to be determined.

At step 608, each characteristic of performance of the automatic-driving software program determined in steps 604 and 606 may be transmitted to the nearby vehicle. The characteristic of performance may be transmitted to one or more other nearby vehicles in addition to the nearby vehicle that transmitted the query. For example, the characteristic of performance may be transmitted to all vehicles within a predetermined range regardless of which vehicle(s) transmitted a query. A record of the transmission may be logged to a storage device and may include a time stamp. The record may include an indication of the characteristic of performance (e.g., an identifier for the characteristic) and/or the value of the characteristic of performance. The transmission may include a request for acknowledgement of receipt by the nearby vehicle of the characteristic of performance. Alternatively, or in addition, a request for acknowledgement may be transmitted separately, and/or the requirement to acknowledge receipt may be specified in the communication protocol without a specific request being required to be transmitted.

The vehicle may receive 610 an acknowledgement of receipt of the characteristic of performance of the automatic-driving software program from the nearby vehicle(s). The acknowledgement may indicate the particular characteristic of performance and/or value for the characteristic that was received by the nearby vehicle. The acknowledgement may be digitally signed by the nearby vehicle. The vehicle may log 612 the acknowledgement by saving it to a persistent storage device. The acknowledgement may be saved with the corresponding record of the transmission. Alternatively, or in addition, the acknowledgement may be logged with a time stamp, an indication of the characteristic of performance, the value of the characteristic of performance, and/or the like that allows it to be saved independent of the transmission. Once the acknowledgement has been logged 612 to the storage device, the method 600 may end until a new query is received 602 and/or a predetermined time has elapsed. In some embodiments, an acknowledgement may not be received and the method 600 may end after the characteristic of performance is transmitted 608 (e.g., an acknowledgement may not be expected, a predetermined time may have elapsed without the acknowledgement being received, etc.).

Figure 7:
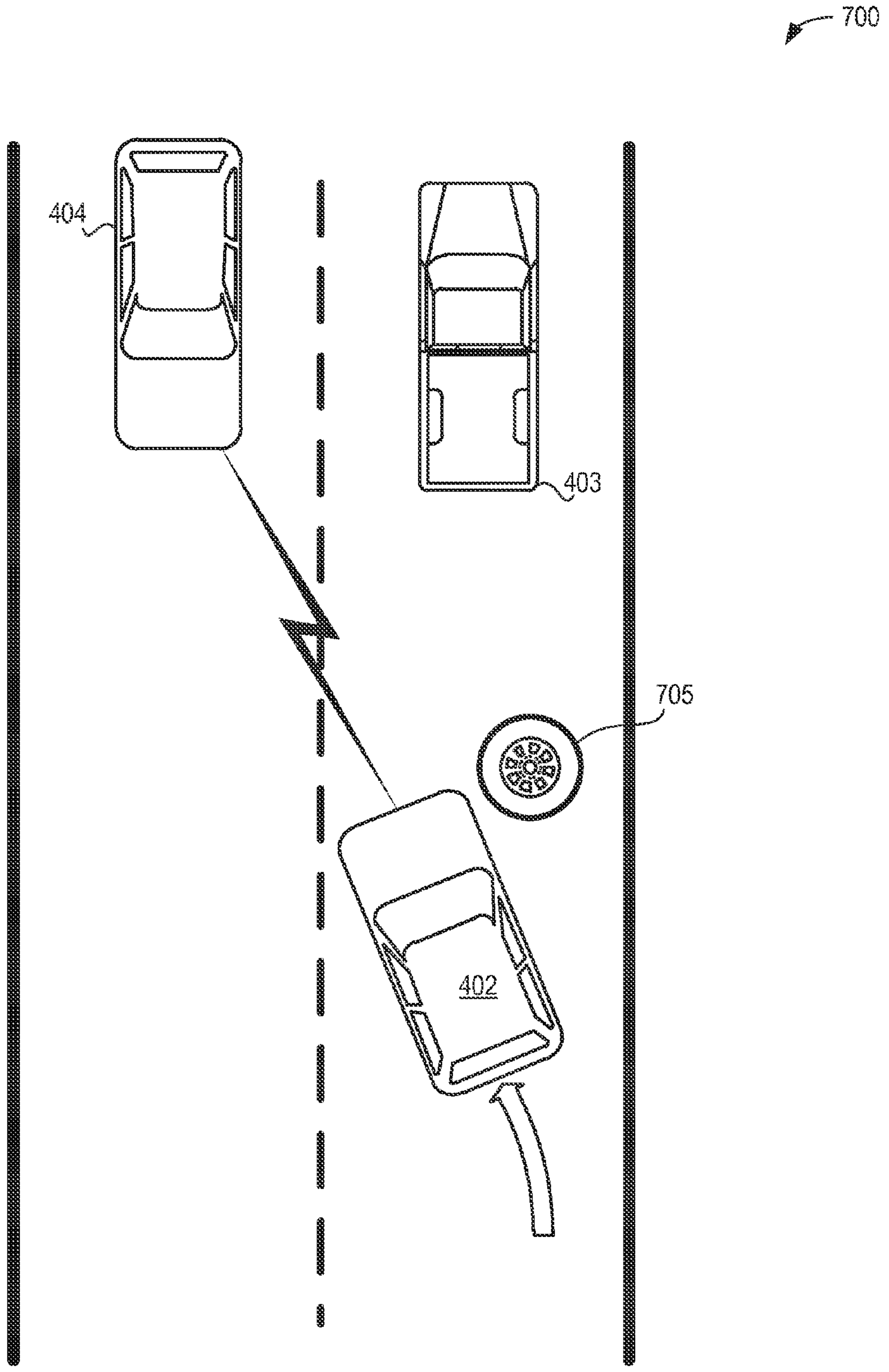
FIG. 7 is a schematic diagram of the vehicle performing a collision avoidance maneuver to avoid an object.

FIG. 7 is a schematic diagram 700 of the vehicle 402 performing a collision avoidance maneuver to avoid an object 705. The vehicle 402 may be communicatively coupled to the nearby vehicles 403, 404 and may report the triggering of the collision avoidance maneuver to one of the nearby vehicles 404. The vehicle 402 may report information on the object to be avoided (e.g., the type of the object 705, a location of the object 705, a kinematic characteristic of the object 705, etc.). Alternatively, or in addition, the vehicle 402 may report additional information on the collision avoidance maneuver, such as the planned maneuver, an anticipated performance in executing the maneuver, an achieved performance in executing the maneuver, and/or the like. For example, the vehicle 402 may enter the lane of an oncoming vehicle 404 when avoiding the object and thus may warn the oncoming vehicle 404 that it will be entering the lane. The vehicle 402 may report the information on the collision avoidance maneuver as the characteristic of performance (e.g., to inform the nearby vehicle 404 of decreased maneuverability or driving skill resulting from the triggering of the collision avoidance maneuver, to inform the nearby vehicle 404 of a change from manual to automatic control, etc.) and/or as a supplement to another characteristic of performance.

Figure 8:
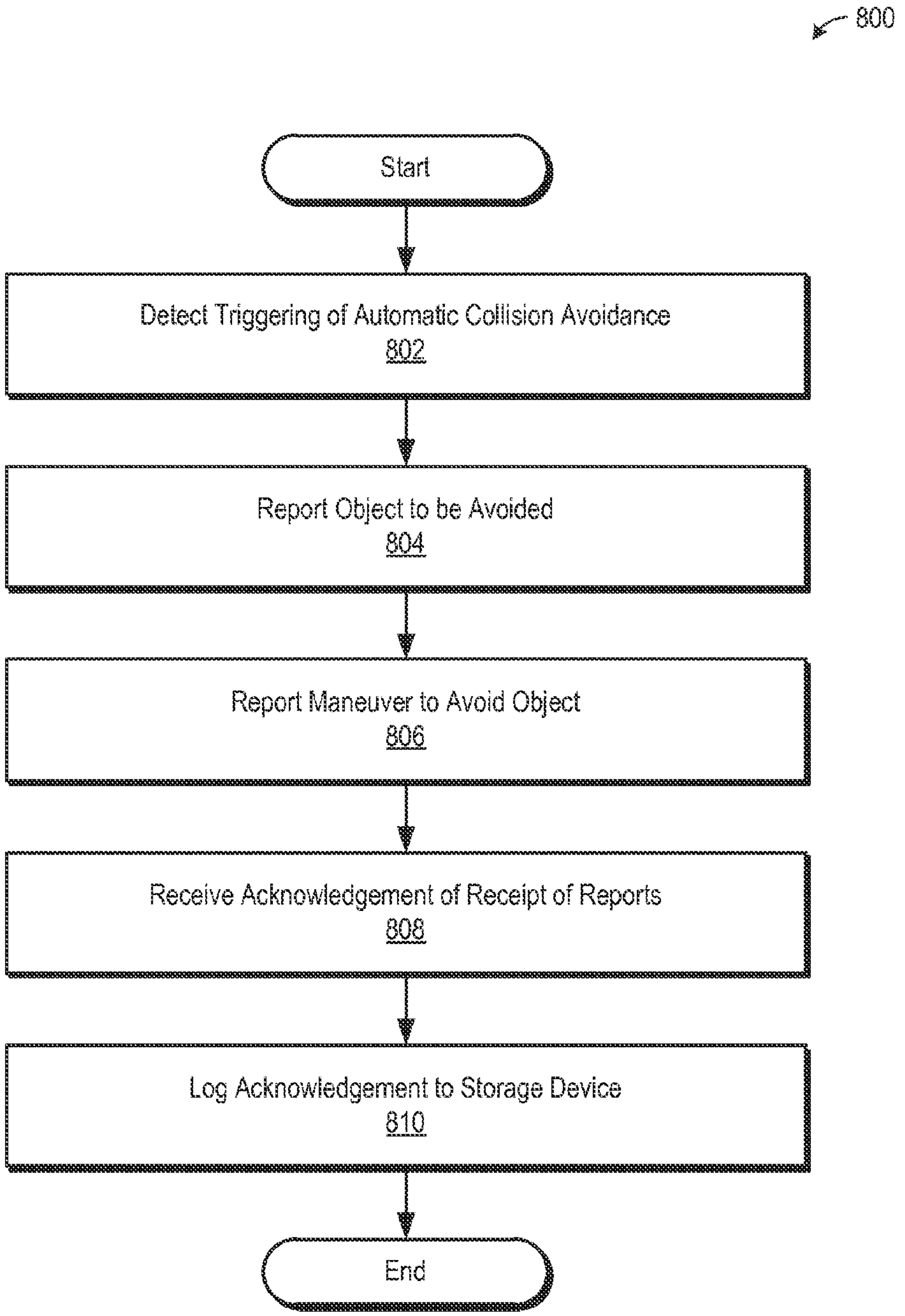
FIG. 8 is a flow diagram of one embodiment of a method for reporting information about a triggering of an automatic collision avoidance maneuver.

FIG. 8 is a flow diagram of one embodiment of a method 800 for reporting information about a triggering of an automatic collision avoidance maneuver. The method 800 may begin when the triggering of an automatic collision avoidance maneuver is detected 802. The triggering may be reported by the automatic-driving software program, may be detected from monitoring the automatic-driving software program (e.g., monitoring an internal variable or dynamic decision of the automatic-driving software program, monitoring whether the automatic-driving software program has control of the vehicle, etc.), and/or the like.

Step 804 may include reporting the object to be avoided to a nearby vehicle, which may include identifying the object, reporting a location of the object, reporting a kinematic characteristic of the object, and/or the like. The characteristics of the object may be determined from reporting by the automatic-driving software program and/or one or more sensors, may be determined by monitoring the automatic-driving software program and/or the one or more sensors, and/or the like. A maneuver to avoid the object may be reported 806 in addition to or instead of the characteristics of the object. The maneuver may be determined from reporting by the automatic-driving software program, monitoring of the automatic-driving software program, monitoring of vehicle controls, and/or the like. The characteristic of the object and indication of the maneuver may be reported as part of a same transmission (e.g., a same packet, a same group of packets, a same session, etc.).

Steps 804 and 806 may include transmitting a request for an acknowledgement of receipt of the reports, and/or a communications protocol may specify that an acknowledgement should be returned. An acknowledgement of receipt of the reports may be received 808 in response to the reporting of step 804 and/or step 806. The acknowledgement may indicate the particular data received, that a checksum did not indicate any errors, and/or the like. The acknowledgement may be digitally signed by an acknowledging vehicle. The received acknowledgement may be logged 810 by saving it to a persistent storage device. The acknowledgement may be saved with a corresponding record of the reporting of step 804 and/or step 806. Alternatively, or in addition, the acknowledgement may be logged with a time stamp, an indication of the reported values, and/or the like so the acknowledgement can be saved independent of the reporting. Once the acknowledgement has been logged 810 to the storage device, the method 800 may end until a new triggering of an automatic collision avoidance maneuver is detected. In some embodiments, an acknowledgement may not be received and the method 800 may end after the reporting of step 804 and/or step 806 (e.g., an acknowledgement may not be expected, a predetermined time may have elapsed without the acknowledgement being received, etc.).

Figure 9:
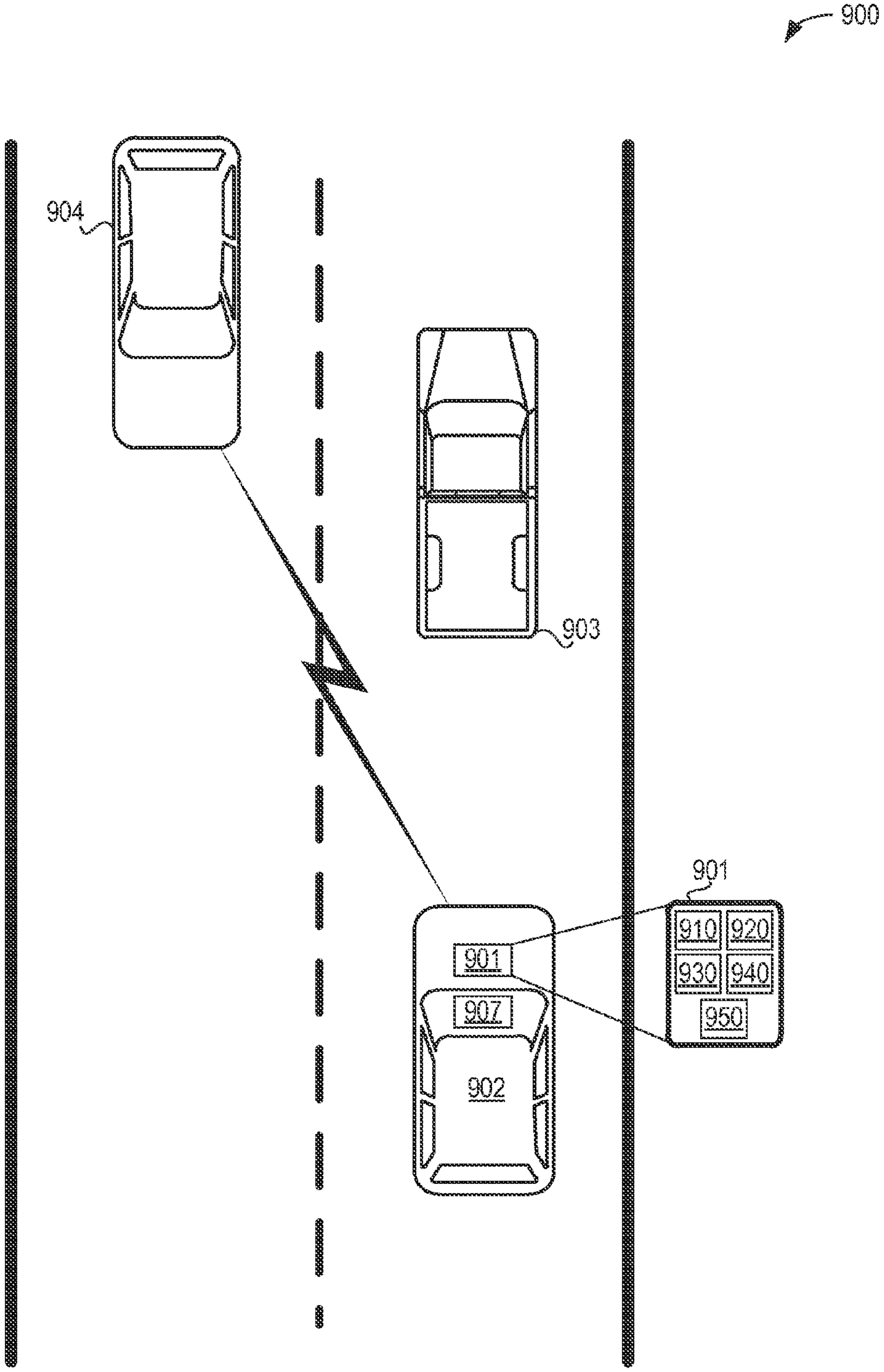
FIG. 9 is a block diagram depicting one embodiment of an exemplary computer system operating on a ground vehicle.

FIG. 9 is a block diagram 900 depicting one embodiment of an exemplary computer system 901 operating on a ground vehicle 902, such as a car, truck, bus, train, or any other type of vehicle. The computer system 901 may include a monitoring unit 910 configured to determine the value of a characteristic of performance of an operator of the vehicle 902. The monitoring unit 910 may include one or more sensors (not shown), electronic devices, and/or software programs (e.g., software programs configured to operate on a processor 930) that it uses to determine the characteristic of operator performance. In some embodiments, the computer system 901 may also include a test unit 920 configured to perform a test that will allow the monitoring unit 910 to determine the characteristic of operator performance.

The monitoring unit 910 and/or the test unit 920 may be communicatively coupled to human-machine interface components 907 of the vehicle. The human-machine interface components 907 may allow the monitoring unit 910 and/or another vehicle system to receive information from and/or deliver information to an operator and/or occupant. The human-machine interface components 907 may include, but are not limited to: visual display components (e.g., display screens, heads-up displays, or the like), audio components (e.g., a vehicle audio system, speakers, or the like), haptic components (e.g., power steering controls, force feedback systems, or the like), and so on. The human-machine interface components 907 may include an entertainment system, a hands-free communication system, a mapping and/or traffic reporting system, a driver impairment detection system, and/or the like. The human-machine interface components 907 may allow the software program to deliver an alert to a vehicle operator.

The monitoring unit 910 may determine the characteristic of operator performance by determining an impairment to the operator, by monitoring historic performance by the operator, by monitoring habits of the operator, and/or the like. In some embodiments, the monitoring unit 910 may require the test unit 920 to perform a test that will allow the monitoring unit 910 to determine the characteristic of operator performance. For example, the test unit 920 may need to test a physiological characteristic of the operator so the monitoring unit can determine whether the operator is impaired. Accordingly, the test unit 920 may cause one or more sensors to measure physiological characteristics of the operator. Alternatively, or in addition, the test unit 920 may be configured to identify the operator so that operator-specific characteristics can be determined (e.g., impairment may be determined based on previous measurements, historical performance of the operator may be saved and updated during operation, etc.).

The computer system 901 may include a communications interface 940 for communicating with a nearby vehicle (e.g., the nearby vehicles 903, 904). The communications interface 940 may transmit the characteristic of operator performance to the nearby vehicle 904 to thereby improve decision making by a manual and/or automatic operator of the nearby vehicle 904. The communications interface 940 may include, but is not limited to, one or more: wireless network interfaces, cellular data interfaces, satellite communication interfaces, electro-optical network interfaces (e.g., infrared communication interfaces), wired network interfaces, and/or the like and/or may facilitate physical transport of storage media. The communications interface 940 may be configured to communicate directly with other vehicles, in vehicle-to-vehicle "ad-hoc" networks and/or infrastructure networks, such as the Internet, and/or the like. The communications interface 940 may cryptographically protect messages, such as by encrypting messages, digitally signing messages, and/or the like, and/or may be able to decode and/or authenticate received messages.

The computer system 901 may further include a storage device 950 that is configured to store the value of the characteristic of operator performance (e.g., to determine/track a historical characteristic over time) and/or log communications by the communications interface 940, such as queries for the characteristic of operator performance, transmission of the characteristic of operator performance, acknowledgements of receipt of the characteristic of operator performance, etc. The storage device 950 may include persistent storage media, such as hard disks, solid-state storage, optical storage media, or the like. The persistent storage media may also store program code for the monitoring unit 910, the test unit 920, and/or the like, and/or a separate storage media may store the program code for the monitoring unit 910 and/or the test unit 920. The storage device 950 may be configured to prevent unauthorized access to and/or modification of stored information. Accordingly, the storage device 950 may be configured to encrypt information for storage. The storage device 950 may also provide for validating authenticity of stored information; for example, the storage device 950 may be configured to cryptographically sign stored information.

Figure 10:
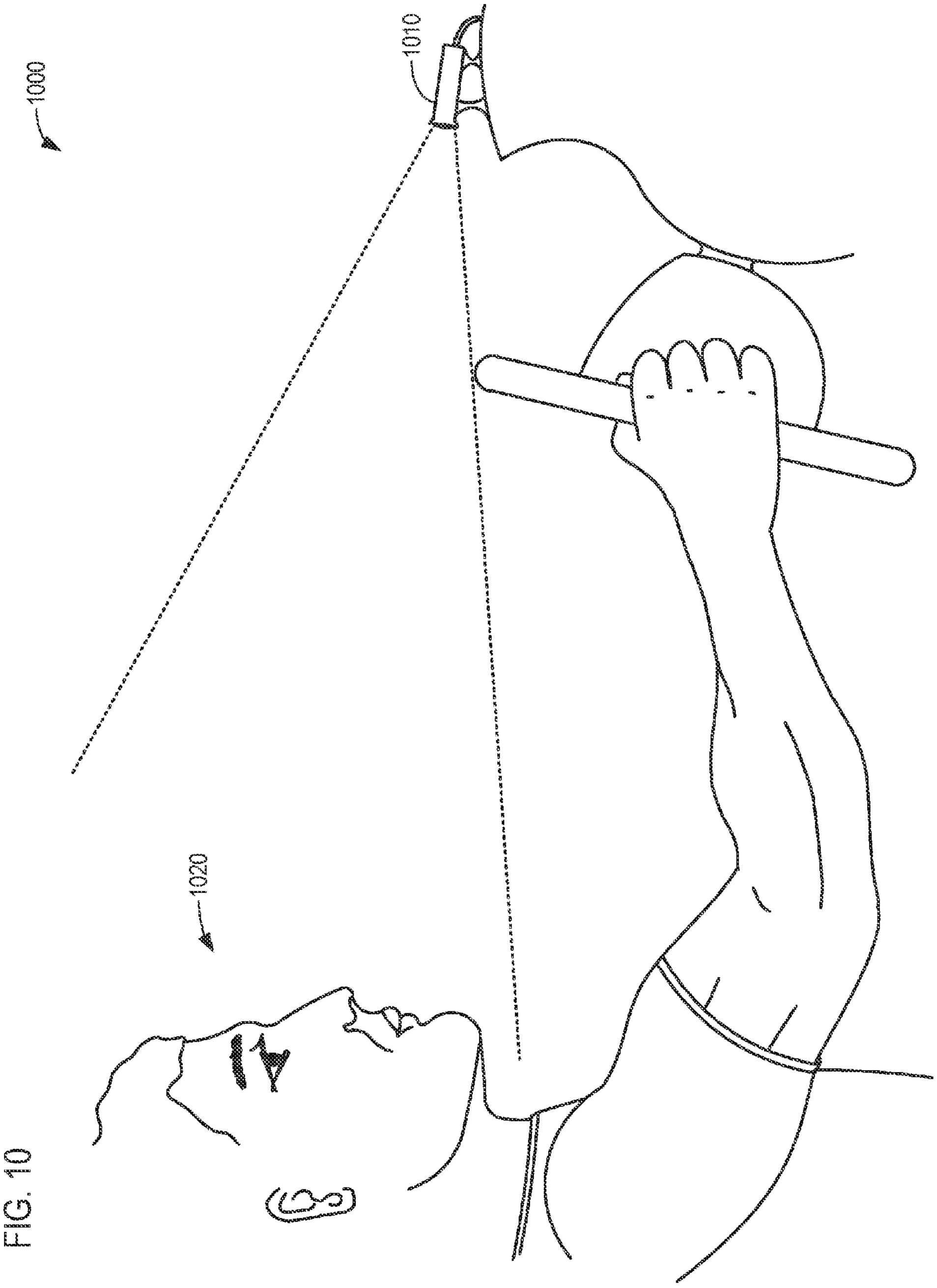
FIG. 10 is a perspective view of a vehicle cockpit according to one embodiment of a system for determining a characteristic of performance of a vehicle operator.

FIG. 10 is a perspective view of a vehicle cockpit 1000 according to one embodiment of a system for determining a characteristic of performance of a vehicle operator 1020. The vehicle cockpit 1000 may include a sensor 1010 configured to monitor the vehicle operator (e.g., to determine an impairment, to monitor habits, such as checking blind spots, etc.). For example, the sensor 1010 may be configured to detect operator fatigue by measuring the duration and/or frequency of blinking by the operator 1020. The measurements by the sensor 1010 may be used by a vehicle computer to determine a performance score (e.g., a score indicating an impairment level of the operator), to determine whether the operator is impaired, and/or the like. The measurements by the sensor 1010 may be coordinated with other measurements (e.g., vehicle motion, control system inputs, etc.) to determine the performance of the operator, such as whether the operator looks in the proper direction when executing various maneuvers.

Figure 11:
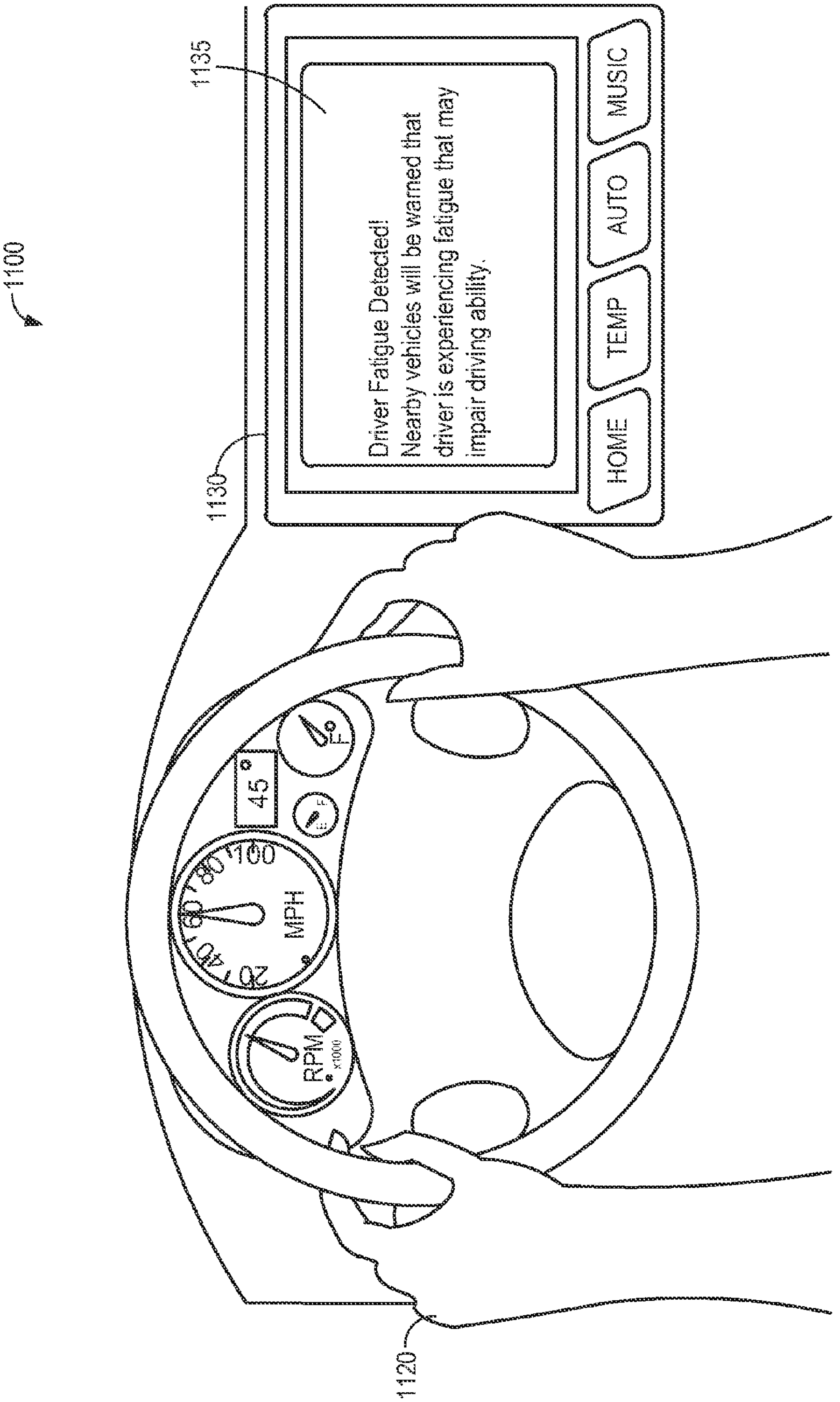
FIG. 11 is a perspective view of a vehicle cockpit according to another embodiment of a system for determining a characteristic of performance of a vehicle operator.

FIG. 11 is a perspective view of a vehicle cockpit 1100 according to another embodiment of a system for determining a characteristic of performance of a vehicle operator 1120. In the illustrated embodiment, the vehicle cockpit 1100 may include a screen 1130 for providing information to the operator 1120, such as information 1135 about the performance of the operator 1120. For example, the information 1135 may indicate an impairment (e.g., fatigue) that has been detected rather than only telling vehicles of the impairment. The operator 1120 can then take steps to correct the impairment, such as discontinuing operation of the vehicle until the impairment is resolved. Similarly, the screen 1130 may inform the operator 1120 of bad habits, types of maneuvers performed poorly, and/or the like so the operator 1120 can improve performance. In alternative embodiments, the vehicle 1100 may not provide information 1135 about operator performance to the operator 1120 and may transmit the characteristic to nearby vehicles without the operator 1120 knowing the particular values being transmitted.

Figure 12:
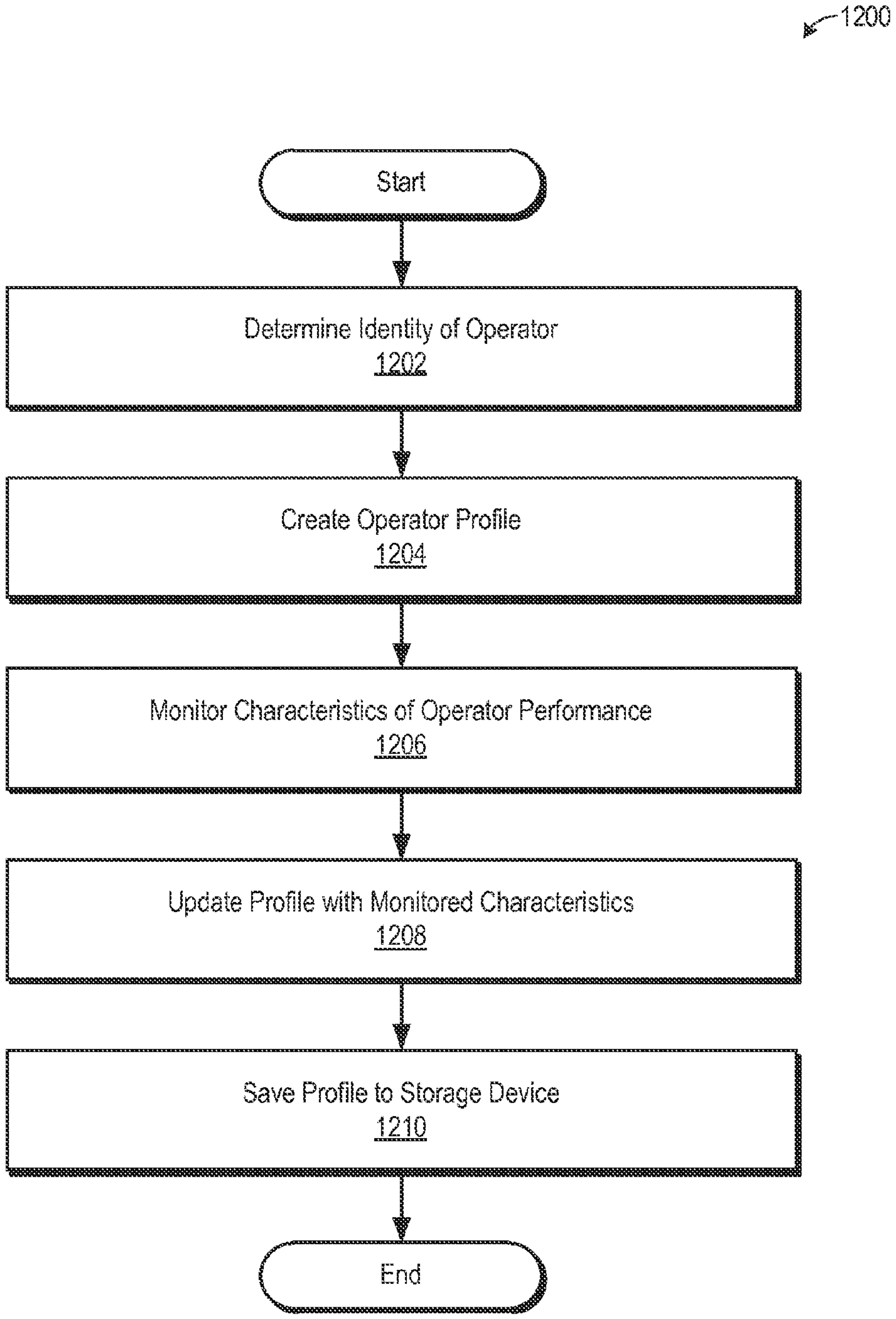
FIG. 12 is a flow diagram of one embodiment of a method for evaluating a historical characteristic of performance of an operator.

FIG. 12 is a flow diagram of one embodiment of a method 1200 for evaluating a historical characteristic of performance of an operator. In embodiments where a characteristic of operator performance is operator specific, the method 1200 may begin by determining 1202 the identity of the operator. The operator may be identified based on height, weight, physiological data, driving style, key, face recognition, and/or the like. The identity of the operator may be determined 1202 when the operator enters the vehicle, when the operator starts the vehicle, and/or the like. If it is determined that a new operator is using the vehicle, a new operator profile may be created 1204 for the operator. The operator profile may include one or more historical characteristics of operator performance that will be monitored. The one or more historical characteristics may initially be set to zero, a null value, and/or the like. If the operator has previously used the vehicle, an already existing profile may be used when evaluating the historical characteristics.

At step 1206, the characteristic of operator performance may be monitored. For example, when it is detected that the operator is performing a particular maneuver, the operator's performance in executing that maneuver may be determined. Alternatively, or in addition, a characteristic of operator performance, such as speed, attentiveness, and/or the like, may be continuously monitored and/or periodically sampled. The operator profile may be updated 1208 based on the monitored performance. For example, the operator profile may include one or more entries containing an indication of a number of occurrences of a particular action, a statistical characteristic of operator performance, and/or the like, and the entries may be updated by incrementing the number of occurrences, by adjusting the statistical characteristic to reflect the new information, and/or the like. The updated operator profile may be saved 1210 to a persistent storage device. The profile may be encrypted and/or digitally signed to prevent tampering by the operator. Steps 1206-1210 may be repeated and/or performed continuously while the operator is using the vehicle. When the operator finishes using the vehicle, the method 1200 may end until the vehicle is used again.

Figure 13:
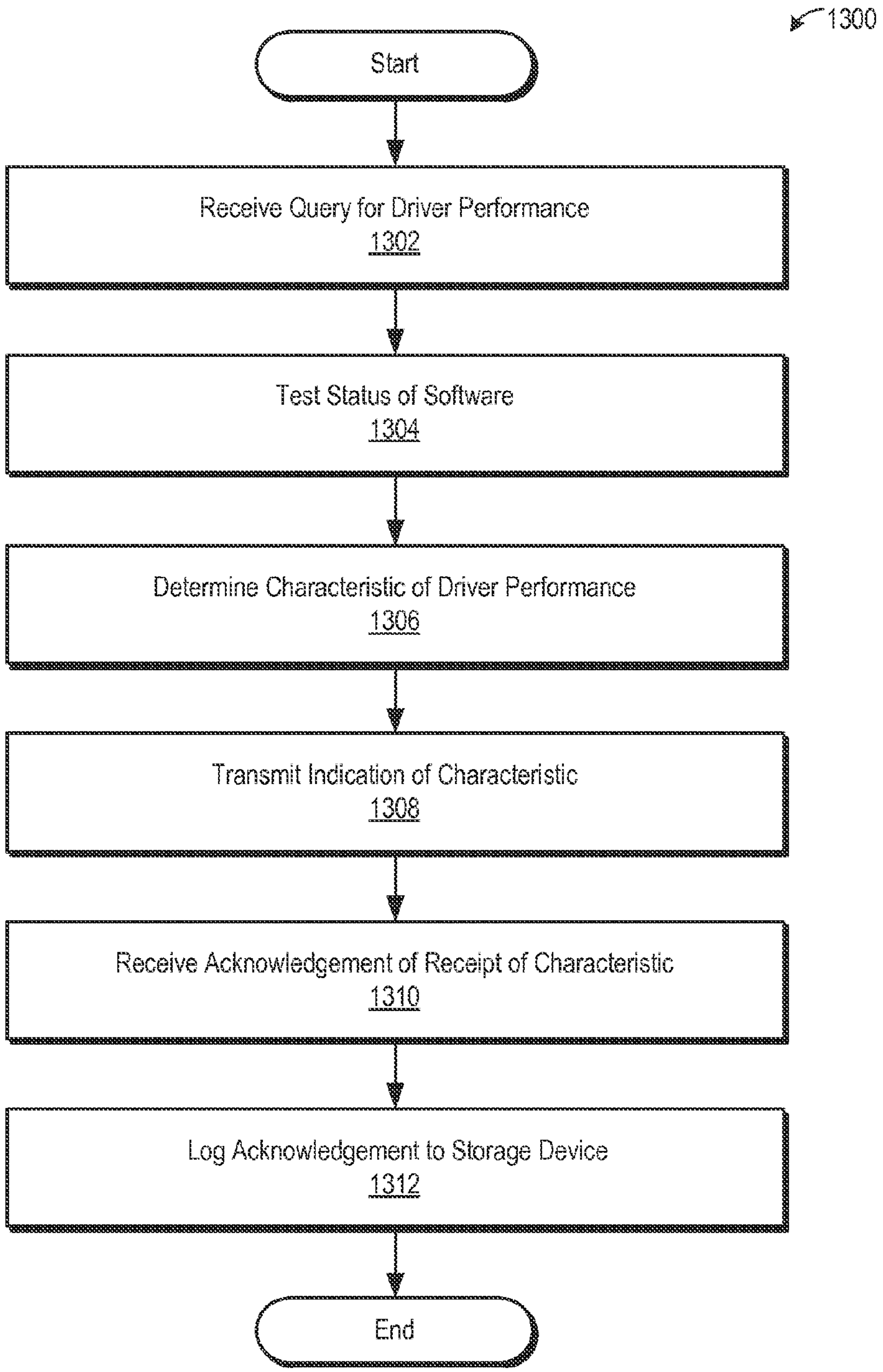
FIG. 13 is a flow diagram of one embodiment of a method for reporting a characteristic of performance of an operator of a vehicle to a nearby vehicle.

FIG. 13 is a flow diagram of one embodiment of a method 1300 for reporting a characteristic of performance of an operator of a vehicle to a nearby vehicle. The method 1300 may begin when a query for the characteristic of operator performance is received 1302 from the nearby vehicle. In other embodiments, the method 1300 may begin periodically and/or without receiving 1302 a query. The query may specify which characteristic of operator performance should be provided, may request all characteristics of operator performance, may request characteristics of operator performance that have changed since the last query, and/or the like.

For some characteristics of operator performance, a test of the condition of the operator may need to be performed to determine the characteristic (e.g., to determine whether the operator is impaired). Accordingly, step 1304 may include testing the condition of the vehicle operator. The particular test performed may be determined based on the characteristic of operator performance requested by the query and unnecessary testing may not be performed. Alternatively, or in addition, the condition of the operator may be evaluated periodically, and a memory and/or storage device may be accessed to retrieve the most recent values. The characteristic of operator performance may be computed 1306, for example, based on the test performed in step 1304. If additional characteristics of operator performance need to be determined, steps 1304 and/or 1306 may be repeated for each additional characteristic of operator performance to be determined.

At step 1308, each characteristic of operator performance that was determined in steps 1304 and 1306 may be transmitted to the nearby vehicle. The characteristic of operator performance may be transmitted to one or more other nearby vehicles in addition to the nearby vehicle that transmitted the query. For example, the characteristic of operator performance may be transmitted to all vehicles within a predetermined range regardless of which vehicle(s) transmitted a query. A record of the transmission may be logged to a storage device and may include a time stamp. The record may include an indication of the characteristic of operator performance (e.g., an identifier for the characteristic) and/or the value of the characteristic of operator performance. The transmission may include a request for acknowledgement of receipt by the nearby vehicle of the characteristic of operator performance. Alternatively, or in addition, a request for acknowledgement may be transmitted separately, and/or the requirement to acknowledge receipt may be specified in the communication protocol without a request being required to be transmitted.

The vehicle may receive 1310 an acknowledgement of receipt of the characteristic of operator performance from the nearby vehicle(s). The acknowledgement may indicate the particular characteristic of operator performance and/or the particular value of the characteristic of operator performance that was received by the nearby vehicle. The acknowledgement may be digitally signed by the nearby vehicle. The vehicle may log 1312 the acknowledgement by saving it to a persistent storage device. The acknowledgement may be logged with the corresponding record of the transmission. Alternatively, or in addition, the acknowledgement may include a time stamp, an indication of the characteristic of operator performance, the value of the characteristic of operator performance, and/or the like that allows it to be saved independent of the transmission. Once the acknowledgement has been logged 1312 to the storage device, the method 1300 may end until a new query is received 1302 and/or a predetermined time has elapsed. In some embodiments, an acknowledgement may not be received and the method 1300 may end after the characteristic of operator performance is transmitted 1308 (e.g., an acknowledgement may not be expected, a predetermined time may have elapsed without the acknowledgement being received, etc.).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for reporting real-time handling capabilities of a vehicle, the system comprising:

a monitoring unit configured to, determine one or more current conditions of the vehicle;

determine a time-varying handling characteristic of the vehicle based on the one or more current conditions of the vehicle, wherein the time-varying handling characteristic comprises a predicted handling capability that varies based on the one or more conditions of the vehicle; and a communication unit configured to transmit the time-varying handling characteristic to a nearby vehicle.

2. The system of claim 1, wherein the time-varying handling characteristic comprises a braking distance.

3. The system of claim 1, wherein the time-varying handling characteristic comprises an acceleration.

4. The system of claim 3, wherein the time-varying handling characteristic comprises a linear acceleration.

5. The system of claim 3, wherein the time-varying handling characteristic comprises a rotational acceleration.

6. The system of claim 1, wherein the time-varying handling characteristic comprises a deceleration.

7. The system of claim 1, wherein the monitoring unit determines the time-varying handling characteristic based on the one or more conditions comprising a vehicle velocity.

8. The system of claim 1, wherein the monitoring unit determines the time-varying handling characteristic based on the one or more conditions comprising an engine rotation speed.

9. The system of claim 1, wherein the monitoring unit determines the time-varying handling characteristic based on the one or more conditions comprising a gear ratio.

10. The system of claim 1, wherein the monitoring unit determines the time-varying handling characteristic based on the one or more conditions comprising a power output from an electric motor.

11. The system of claim 1, wherein the monitoring unit determines the time-varying handling characteristic based on the one or more conditions comprising an occupant status.

12. The system of claim 11, wherein the occupant status comprises an ability to perform a maneuver without injuring an occupant.

13. The system of claim 1, wherein the communication unit is further configured to transmit a planned maneuver.

14. The system of claim 13, wherein the communication unit is further configured to transmit anticipated changes in the time-varying handling characteristic as the planned maneuver is executed.

15. The system of claim 13, wherein the communication unit is further configured to transmit an anticipated performance in executing the planned maneuver.

16. The system of claim 13, wherein the communication unit is further configured to transmit an achieved performance in executing the planned maneuver.

17. The system of claim 1, wherein the communication unit is configured to transmit the time-varying handling characteristic using radio-frequency radiation.

18. The system of claim 1, wherein the communication unit is configured to transmit the time-varying handling characteristic using optical radiation.

19. The system of claim 1, wherein the nearby vehicle is unassociated with the vehicle.

20. A non-transitory computer readable storage medium comprising program code configured to cause a processor to perform a method for reporting real-time handling capabilities of a vehicle, the method comprising:

determining one or more current conditions of the vehicle;

determining a time-varying handling characteristic of the vehicle based on the one or more current conditions of the vehicle, wherein the time-varying handling characteristic comprises a predicted handling capability that varies based on the one or more conditions of the vehicle; and transmitting the time-varying handling characteristic to a nearby vehicle.

21. The non-transitory computer readable storage medium of claim 20, wherein transmitting the time-varying handling characteristic comprises transmitting a minimum value of the time-varying handling characteristic.

22. The non-transitory computer readable storage medium of claim 20, wherein determining the one or more current conditions comprises determining a tire status.

23. The non-transitory computer readable storage medium of claim 20, wherein determining one or more current conditions comprises determining a brake status.

24. The non-transitory computer readable storage medium of claim 20, wherein the one or more current conditions comprises a drivetrain status.

25. The non-transitory computer readable storage medium of claim 20, wherein the one or more current conditions comprises a current weight.

26. The non-transitory computer readable storage medium of claim 20, wherein determining the one or more current conditions comprises determining a weight distribution.

27. The non-transitory computer readable storage medium of claim 20, wherein the one or more current conditions comprises a characteristic of a trailer.

28. The non-transitory computer readable storage medium of claim 20, wherein the one or more current conditions comprises a wind loading.

29. The non-transitory computer readable storage medium of claim 20, wherein the time one or more current conditions comprises an aerodynamic loading.

30. The non-transitory computer readable storage medium of claim 20, wherein determining the time-varying handling characteristic comprises determining the time-varying handling characteristic based on the one or more current conditions comprising a location of another vehicle.

31. The non-transitory computer readable storage medium of claim 30, wherein the location of the other vehicle affects aerodynamic loading of the vehicle.

32. The non-transitory computer readable storage medium of claim 30, wherein the location of the other vehicle affects obscuration of a field of view of the vehicle.

33. The non-transitory computer readable storage medium of claim 20, wherein the method further comprises receiving reported handling characteristics from a reporting vehicle.

34. The non-transitory computer readable storage medium of claim 33, wherein determining the time-varying handling characteristics comprises determining the time-varying handling characteristic based on the reported handling characteristics of the reporting vehicle.

35. The non-transitory computer readable storage medium of claim 20, wherein the method further comprises receiving a planned maneuver from a reporting vehicle.

36. The non-transitory computer readable storage medium of claim 35, wherein determining the time-varying handling characteristics comprises determining the time-varying handling characteristic based on the planned maneuver of the reporting vehicle.

37. The non-transitory computer readable storage medium of claim 20, wherein the method further comprises receiving an acknowledgement of receipt of the time-varying handling characteristic.

38. The non-transitory computer readable storage medium of claim 37, wherein the method further comprises saving the acknowledgement of receipt of the time-varying handling characteristic to a persistent computer readable storage medium.

* * * * *

UNITED STATES PATENT AND TRADEMARK OFFICE

CERTIFICATE OF CORRECTION

PATENT NO. : 9,123,250 B2
APPLICATION NO. : 14/098310
DATED : September 1, 2015
INVENTOR(S) : William David Duncan et al.

It is certified that error appears in the above-identified patent and that said Letters Patent is hereby corrected as shown below:

In the Claims

Column 26, line 52, claim 29 reads "of claim 20, wherein the time one or more current conditions" should read --of claim 20, wherein the one or more current conditions--

Signed and Sealed this
Fifteenth Day of March, 2016

Michelle K. Lee
*Director of the United States Patent and Trademark Office*